United States Patent
Noh et al.

(10) Patent No.: US 10,425,141 B2
(45) Date of Patent: Sep. 24, 2019

(54) METHOD AND DEVICE FOR TRANSMITTING REFERENCE SIGNAL IN COMMUNICATION SYSTEM

(71) Applicant: Samsung Electronics Co., Ltd, Suwon-si (KR)

(72) Inventors: Hoon-Dong Noh, Suwon-si (KR); Youn-Sun Kim, Seongnam-si (KR); Young-Woo Kwak, Suwon-si (KR); Cheol-Kyu Shin, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/773,940

(22) PCT Filed: Nov. 4, 2016

(86) PCT No.: PCT/KR2016/012687
§ 371 (c)(1),
(2) Date: May 4, 2018

(87) PCT Pub. No.: WO2017/078475
PCT Pub. Date: May 11, 2017

(65) Prior Publication Data
US 2018/0359014 A1    Dec. 13, 2018

(30) Foreign Application Priority Data

Nov. 6, 2015  (KR) .................. 10-2015-0155709

(51) Int. Cl.
*H04B 7/06* (2006.01)
*H04B 7/04* (2017.01)
(Continued)

(52) U.S. Cl.
CPC .............. *H04B 7/0626* (2013.01); *H04B 7/04* (2013.01); *H04B 7/0417* (2013.01);
(Continued)

(58) Field of Classification Search
None
See application file for complete search history.

(56) References Cited

U.S. PATENT DOCUMENTS

| 9,136,997 B2 * | 9/2015 | Gaal ................ H04L 5/0048 |
| 2011/0199986 A1 * | 8/2011 | Fong ................ H04L 5/0035 370/329 |

(Continued)

FOREIGN PATENT DOCUMENTS

| WO | 2014/058170 A1 | 4/2014 |
| WO | 2014/122689 A1 | 8/2014 |

OTHER PUBLICATIONS

European Patent Office, "Supplementary European Search Report," Application No. EP 16862490.6, dated Oct. 8, 2018, 14 pages.

(Continued)

*Primary Examiner* — Fayyaz Alam

(57) ABSTRACT

Disclosed is a communication scheme and a system therefor, the communication scheme for merging, with IoT technology, a 5G communication system for supporting a data transmission rate higher than that of a 4G system. The present disclosure can be applied to intelligent services (such as smart home, smart building, smart city, smart car or connected car, healthcare, digital education, retail business, security, and safety related services) on the basis of 5G communication technology and IoT related technology. A method of receiving channel feedback information by an evolved node B (eNB) in a communication system using multiple antennas, provided in an embodiment of the present disclosure, includes generating reference signal configuration information comprising power boosting information associated with reference signals; transmitting the reference signal configuration information to a user equipment (UE); and receiving channel feedback information on a channel state estimated based on the reference signal configuration information from the UE.

20 Claims, 16 Drawing Sheets

(51) Int. Cl.
*H04B 7/0417* (2017.01)
*H04L 25/02* (2006.01)
*H04W 52/04* (2009.01)
*H04W 4/02* (2018.01)
*H04W 84/04* (2009.01)

(52) U.S. Cl.
CPC ......... *H04L 25/0224* (2013.01); *H04W 52/04* (2013.01); *H04W 4/02* (2013.01); *H04W 84/042* (2013.01)

(56) References Cited

U.S. PATENT DOCUMENTS

| | | | | |
|---|---|---|---|---|
| 2013/0051240 | A1* | 2/2013 | Bhattad | H04L 5/005 370/241 |
| 2013/0182594 | A1* | 7/2013 | Kim | H04W 72/042 370/252 |
| 2013/0329664 | A1* | 12/2013 | Kim | H04W 24/10 370/329 |
| 2015/0155992 | A1* | 6/2015 | Kim | H04B 7/024 370/329 |
| 2018/0205577 | A1* | 7/2018 | Shin | H04B 17/24 |

OTHER PUBLICATIONS

Qualcomm Incorporated, "OTDOA Positioning Enhancements," R1-151422, 3GPP TSG-RAN WG1 Meeting #80bis, Belgrade Serbia, Apr. 20-24, 2015, 10 pages.

International Search Report dated Feb. 8, 2017 in connection with International Patent Application No. PCT/KR2016/012687.

Written Opinion of the International Searching Authority dated Feb. 8, 2017 in connection with International Patent Application No. PCT/KR2016/012687.

Ericsson, "CSI-RS Design for Class A FD-MIMO", 3GPP TSG-RAN WG1 #82bis, Oct. 5-9, 2015, 8 pages, R1-155675.

ZTE, "Extension of Non-Precoded CSI-RS for 12 and 16 Ports", 3GPP TSG RAN WG1 Meeting #82bis, 6 pages, R1-155263.

* cited by examiner

METHOD AND DEVICE FOR TRANSMITTING REFERENCE SIGNAL IN COMMUNICATION SYSTEM

CROSS-REFERENCE TO RELATED APPLICATIONS AND CLAIM OF PRIORITY

This application is a 371 of International Application No. PCT/KR2016/012687 filed Nov. 4, 2016, which claims priority to Korean Patent Application No. 10-2015-0155709 filed Nov. 6, 2015, the disclosures of which are herein incorporated by reference in their entirety.

BACKGROUND

1. Field

The present disclosure relates to a method and device for transmitting a reference signal in a communication system, and more particularly, to a method and device for transmitting a reference signal using uniform power boosting in a mobile system that uses a plurality of array antennas.

2. Description of Related Art

In order to meet wireless data traffic demands that have increased after the commercialization of the 4th Generation (4G) communication system, efforts to develop an improved 5G communication system or a pre-5G communication system have been made. For this reason, the 5G communication system or the pre-5G communication system is called a beyond-4G-network communication system or a post-LTE system.

In order to achieve a high data transmission rate, implementation of the 5G communication system on a super-high frequency (mmWave) band (e.g., 60 GHz band) is being considered. Beamforming, massive Multi-Input Multi-Output (MIMO), Full Dimensional MIMO (FD-MIMO), array antenna, analog beam-forming, and large-scale antenna technologies are being discussed to mitigate propagation path loss in the super-high frequency band and to increase propagation transmission distance in the 5G communication system.

Further, the 5G communication system results in the development of technologies, such as an evolved small cell, an advanced small cell, a cloud Radio Access Network (RAN), an ultra-dense network, Device to Device communication (D2D), a wireless backhaul, a moving network, cooperative communication, Coordinated Multi-Points (CoMP), and received interference cancellation, so as to improve the system network.

In addition, the 5G system results in the development of Hybrid FSK and QAM Modulation (FQAM) and Sliding Window Superposition Coding (SWSC) which are Advanced Coding Modulation (ACM) schemes, and Filter Bank Multi Carrier (FBMC), Non Orthogonal Multiple Access (NOMA), and Sparse Code Multiple Access (SCMA) which are advanced access technologies.

Meanwhile, the Internet has evolved into an Internet of Things (IoT) network in which distributed elements, such as objects, exchange and process information from a human-oriented connection network in which humans generate and consume information. Internet of Everything (IoE) technology may be an example of a combination of IoT technology and big data processing technology via a connection with a cloud server or the like.

In order to implement the IoT, technical factors, such as sensing technology, wired/wireless communication, network infrastructure, service interface technology, and security technology are required, and, thus, technologies such as a sensor network, Machine to Machine (M2M) communication, Machine Type Communication (MTC), and the like for a connection between objects are recently being researched.

In an IoT environment, via collection and analysis of data generated in connected objects, an intelligent Internet Technology (IT) service to create new values for peoples' lives may be provided. The IoT may be applied to fields such as a smart home, a smart building, a smart city, a smart car or connected car, a smart grid, healthcare, smart home appliance, or a high-tech medical service, via the convergence of the conventional Information Technology (IT) and various industries.

Accordingly, various attempts to apply the 5G communication system to the IoT network have been made. For example, 5G communication technologies such as a sensor network, M2M communication, MTC technology, and the like are implemented by the schemes such as beamforming, MIMO, array antenna, and the like. The application of a cloud RAN as the big data processing technology described above may be an example of convergence of the 5G technology and the IoT technology.

The current mobile communication system has been developed into a high-speed and high-quality wireless packet data communication system, so as to provide a huge-capacity data service and a multimedia service, beyond the voice-based service of the earlier era. In order to satisfy such demands, various standardization organizations such as 3GPP, IEEE, and the like, have standardized the 3rd generation evolved mobile communication system to which a multi-carrier based multiple access scheme is applied. Therefore, various mobile communication standards such as Long Term Evolution Advanced (LTE-A) of 3GPP, 802.16m of IEEE, and the like, have been developed based on the multi-carrier multiple access scheme, so as to support the high-speed and high-quality wireless packet data transmission service.

The currently existing $4^{th}$ evolved mobile communication system, such as, LTE-A, 802.16m, and the like, is based on the multi-carrier multi-access scheme. To improve transmission efficiency, the system uses various technologies, such as, Multiple Input Multiple Output (MIMO, multiple antennas), beam-forming, Adaptive Modulation and Coding (AMC), channel sensitive scheduling, and the like. The above-described various technologies may use a method that concentrates transmission power transmitted from various antennas, controls the amount of data to be transmitted, selectively transmits data to a user who has a good channel quality, and the like, using various types of Channel Status Indications (CSIs), whereby the transmission efficiency may be improved and the system throughput may be increased.

Most of those schemes are operated based on channel status information of a channel between an evolved NodeB (eNB) (or Base Station (BS)) and a User Equipment (UE) (or a Mobile Station (MS)) and, thus, the eNB or the UE may need to measure a channel status between the eNB and the UE. In this instance, a Channel Status Indication Reference Signal (CSI-RS) is used. The above-described eNB is a downlink transmitter and uplink receiver located in a predetermined place. A single eNB may execute transmission and reception with respect to a plurality of cells. In a single mobile communication system, a plurality of eNBs are geographically distributed and each eNB may perform transmission and reception with respect to a plurality of cells.

The existing 3G and 4G mobile communication systems, such as, LTE, LTE-A, or the like, utilize the MIMO technology that executes transmission using a plurality of transmitting and receiving antennas to increase the data transmission rate and the system throughput. The MIMO technology performs transmission in a manner that spatially separates a plurality of information streams using a plurality of transmission/reception antennas. The transmission by spatially dividing the plurality of information streams is referred to as spatial multiplexing. Generally, the number of information streams to which spatial multiplexing is applicable may be defined as a rank of a corresponding transmission, and the rank may vary based on the number of antennas of a transmitter and a receiver. In the case of the MIMO technology supported in the standards up to LTE/LTE-A Release 12, spatial multiplexing for the cases in which the number of transmission/reception antennas are 2, 4, and 8, respectively, are supported, and a rank is supported up to 8.

There is a desire for a scheme of accurately measuring a channel between an eNB and a UE when the MIMO technology that performs transmission using a plurality of transmission/reception antennas is used as described above.

The above information is presented as background information only to assist with an understanding of the present disclosure. No determination has been made, as to whether any of the above might be applicable as prior art with regard to the present disclosure.

SUMMARY

According to aspects of the present disclosure, a method and a device for transmitting a reference signal in a communication system are provided.

According to aspects of the present disclosure, a method and a device for applying uniform power boosting when transmitting a reference signal in a communication system that uses massive multiple antennas, are provided.

According to aspects of the present disclosure, a method and a device for using, for resource allocation of a reference signal, a resource to which zero power is allocated for applying uniform power boosting when transmitting a reference signal, are provided.

According to aspects of the present disclosure, a method and a device for applying adaptive power boosting according to a channel environment of a user equipment, are provided.

In accordance with an aspect of the present disclosure, a method of transmitting a reference signal by an evolved NodeB (eNB) in a communication system that uses a large-scale antenna is provided, wherein the method includes: generating reference signal configuration information including power boosting information associated with reference signals; transmitting the configuration information to a User Equipment (UE); and transmitting a reference signal, and receiving, from the UE, channel feedback information estimated based on the configuration information.

In accordance with an aspect of the present disclosure, a method of receiving a reference signal by a UE in a communication system that uses a large-scale antenna, is provided, wherein the method includes: receiving reference signal configuration information including power boosting information associated with reference signals from an eNB; estimating a channel, based on the configuration information; and feeding the estimated channel information back to the eNB.

In accordance with an aspect of the present disclosure, an eNB for transmitting a reference signal in a communication system that uses a large-scale antenna is provided, wherein the apparatus includes: a controller configured to generate reference signal configuration information including power boosting information associated with reference signals; a transmitting unit configured to transmit the configuration information to a UE; and a receiving unit configured to receive channel feedback information estimated based on the configuration information from the UE after a reference signal is transmitted.

In accordance with an aspect of the present disclosure, a UE for receiving a reference signal in a communication system that uses a large-scale antenna is provided, wherein the UE includes: a receiving unit configured to receive reference signal configuration information including power boosting information associated with reference signals from an eNB; a controller configured to estimate a channel, based on the configuration information; and a transmitting unit configured to feed the estimated channel information back to the eNB.

Other aspects, gains, and core features of the present disclosure are processed along with additional drawings, and they are apparent to those skilled in the art from the following detailed description including exemplary embodiments of the present disclosure.

The terms "include", "comprise", and derivatives thereof may mean inclusion without limitation, the term "or" may have an inclusive meaning and means "and/or", the phrases "associated with", "associated therewith", and derivatives thereof may mean to include, be included within, interconnect with, contain, be contained within, connected to or with, coupled to or with, be communicable with, cooperate with, interleave, juxtapose, be proximate to, be bound to or with, have, and have a property of, the term "controller" may mean any device, system, or a part thereof that controls at least one operation, and such a device may be implemented in hardware, firmware, or software, or some combinations of at least two of the same. It should be noted that the functionality associated with any particular processor may be centralized or distributed, whether locally or remotely. Definitions for certain words and phrases are provided throughout this patent document, those skilled in the art should understand that in many, if not most instances, such definitions apply to prior, as well as future uses of such defined words and phrases.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
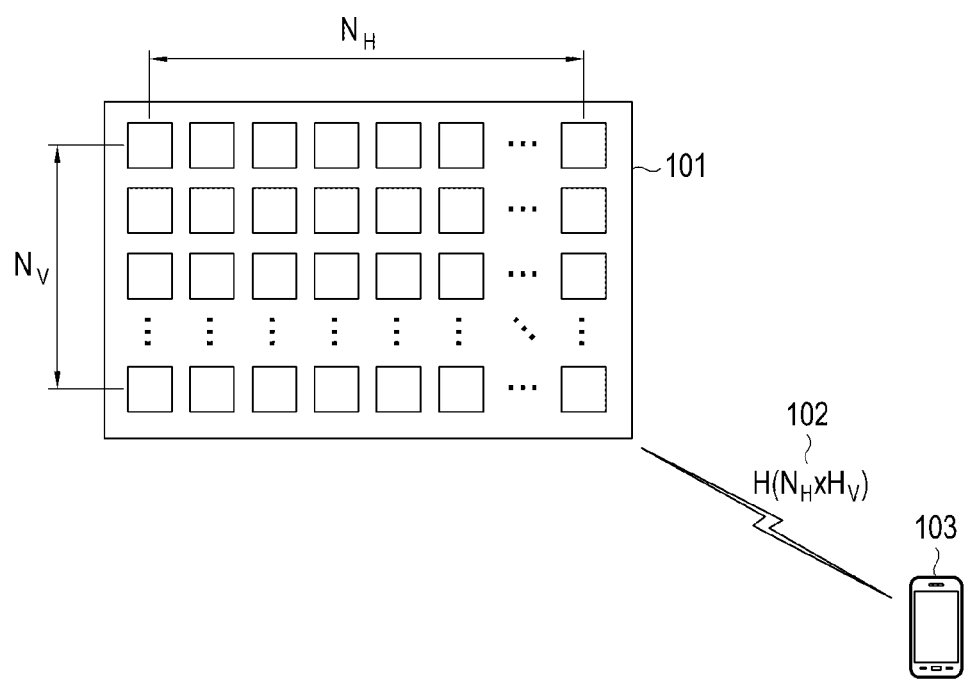
FIG. 1 is a diagram illustrating an example of a massive MIMO system to which an embodiment of the present disclosure is applied.

Hereinafter, operation principles of exemplary embodiments of the present disclosure will be described in detail with reference to accompanying drawings. Like reference numerals designate like components in the drawings where possible even though components are shown in different drawings. In the following description of the present disclosure, a detailed description of related known functions or configurations will be omitted so as not to obscure the subject of the present disclosure. The terms as described below are defined in consideration of the functions in the embodiments, and the meaning of the terms may vary according to the intention of a user or operator, convention, or the like. Therefore, the definitions of the terms should be made based on the contents throughout the specification.

The present disclosure may have various modifications and various embodiments, among which specific embodiments will now be described more fully with reference to the accompanying drawings. However, it should be understood that there is no intent to limit the present disclosure to the particular forms disclosed, but on the contrary, the present disclosure is to cover all modifications, equivalents, and alternatives falling within the spirit and scope of the disclosure.

Further, it will be appreciated that singular expressions such as "an" and "the" include plural expressions as well, unless the context clearly indicates otherwise. Accordingly, as an example, a "component surface" includes one or more component surfaces.

Although the terms including an ordinal number such as first, second, etc. can be used for describing various elements, the structural elements are not restricted by the terms. The terms are used merely for the purpose to distinguish an element from the other elements. For example, a first element could be termed a second element, and similarly, a second element could be also termed a first element without departing from the scope of the present disclosure. As used herein, the term "and/or" includes any and all combinations of one or more associated items.

The terms used herein are used only to describe particular embodiments, and are not intended to limit the present disclosure. As used herein, the singular forms are intended to include the plural forms as well, unless the context clearly indicates otherwise. In the present disclosure, the terms such as "include" and/or "have" may be construed to denote a certain characteristic, number, step, operation, constituent element, component or a combination thereof, but may not be construed to exclude the existence of or a possibility of addition of one or more other characteristics, numbers, steps, operations, constituent elements, components or combinations thereof.

Unless defined otherwise, all terms used herein, including technical and scientific terms, have the same meaning as those commonly understood by a person of ordinary skill in the art to which the present disclosure pertains. Such terms as those defined in a generally used dictionary are to be interpreted to have the meanings equal to the contextual meanings in the relevant field of art, and are not to be interpreted to have ideal or excessively formal meanings unless clearly defined in the present specification.

Embodiments of the present disclosure will be described in detail from the perspective of an Orthogonal Frequency Division Multiplexing (OFDM)-based wireless communication system, particularly, 3GPP Evolved Universal Terrestrial Radio Access (EUTRA) standard. However, the subject matter of the present disclosure can be slightly modified within a scope not departing from the scope of the present disclosure and can be applied to other communication systems having similar technical backgrounds and channel forms, which are executed based on the decision made by those skilled in the field of the present disclosure.

The present disclosure relates to a method and a device for configuring a reference signal for uniform power boosting by a plurality of eNBs that use a plurality of active array antennas in a wireless communication system to which multi-carrier multiple access scheme is applied, such as OFDMA or the like. The present disclosure relates to a method in which a User Equipment (UE) measures a radio channel status (channel quality) with respect to a reference signal received from the eNB, generates feedback information to report the measurement result to the eNB, and reports the feedback information.

Hereinafter, it is assumed that a massive MIMO system or full-dimension MIMO (FD-MIMO) system, to which an embodiment of the present disclosure is applied, is configured with a plurality of antennas, wherein the plurality of antennas are eight or more antennas and are arranged in two dimensions. FIG. 1 is a diagram illustrating an example of a massive MIMO system to which an embodiment of the present disclosure is applied.

Referring to FIG. 1, transmission equipment 101 of an eNB transmits a radio signal using dozens or more of transmission antennas. In this instance, the plurality of transmission antennas included in the transmission equipment 101 may be disposed to maintain a predetermined distance therebetween. Herein, the predetermined distance may correspond to a multiple of a half wavelength of a transmitted radio signal. Generally, when the distance corresponding to the half wavelength of the radio signal is maintained between the transmission antennas, a signal transmitted from each transmission antenna may be affected by a radio channel having a low correlation. As the distance between the transmission antennas increases, the correlation between signals may decrease. The transmission equipment of the eNB, which has a massive antenna, may arrange the antennas in two dimensions as shown in FIG. 1, so as to prevent the scale of the equipment from being significantly massive. In this instance, the eNB may transmit a signal using NH antennas arranged in the horizontal axis and NV antennas which are arranged in the vertical axis, and a UE 103 may measure a channel 102 for each of the transmission antennas included in the transmission equipment 101.

The dozens or more transmission antennas disposed in the transmission equipment 101 may be utilized for transmitting a signal to one UE or a plurality of UEs. The eNB may apply an appropriate precoding to the plurality of transmission antennas, so as to transmit a signal to a plurality of UEs in parallel. In this instance, a single UE may receive one or more information streams. Generally, the number of information streams that a single UE may receive may be determined based on the number of reception antennas that the UE contains, as well as a channel status.

In order to effectively implement the massive MIMO system, a UE may need to accurately measure a channel status and the magnitude of interference between transmission/reception antennas using a plurality of received reference signals, and may need to transmit, to an eNB, channel status information based on measurement results. The eNB that receives the channel status information of the corresponding UE may perform scheduling associated with downlink transmission using the same. Specific examples of scheduling may include a procedure of selecting UEs to which transmission is performed by an eNB, a procedure of setting a transmission speed when an eNB transmits data, a procedure of determining a precoding to be applied when data is transmitted, and the like. The FD-MIMO system has a large number of transmission antennas and, thus, when the channel status information transmission/reception method of the conventional LTE/LTE-A system is applied, a large amount of control information needs to be transmitted in an uplink, which may cause an uplink overhead.

However, time, frequency, and power resources are limited in a wireless communication system. Therefore, as the amount of resources allocated to a reference signal increases, the amount of resources that may be allocated to a traffic channel for transmitting data decreases, whereby the absolute amount of data that may be transmitted may also decrease. Therefore, as the amount of resources allocated to a reference signal increases, the performance of channel measurement and estimation thereof may be improved, but the absolute amount of data transmitted decreases, whereby the throughput of the whole system may rather deteriorate.

Accordingly, to have the optimized performance from the perspective of the overall system throughput, resources for a reference signal and resources for traffic channel transmission need to be appropriately distributed.

Figure 2:
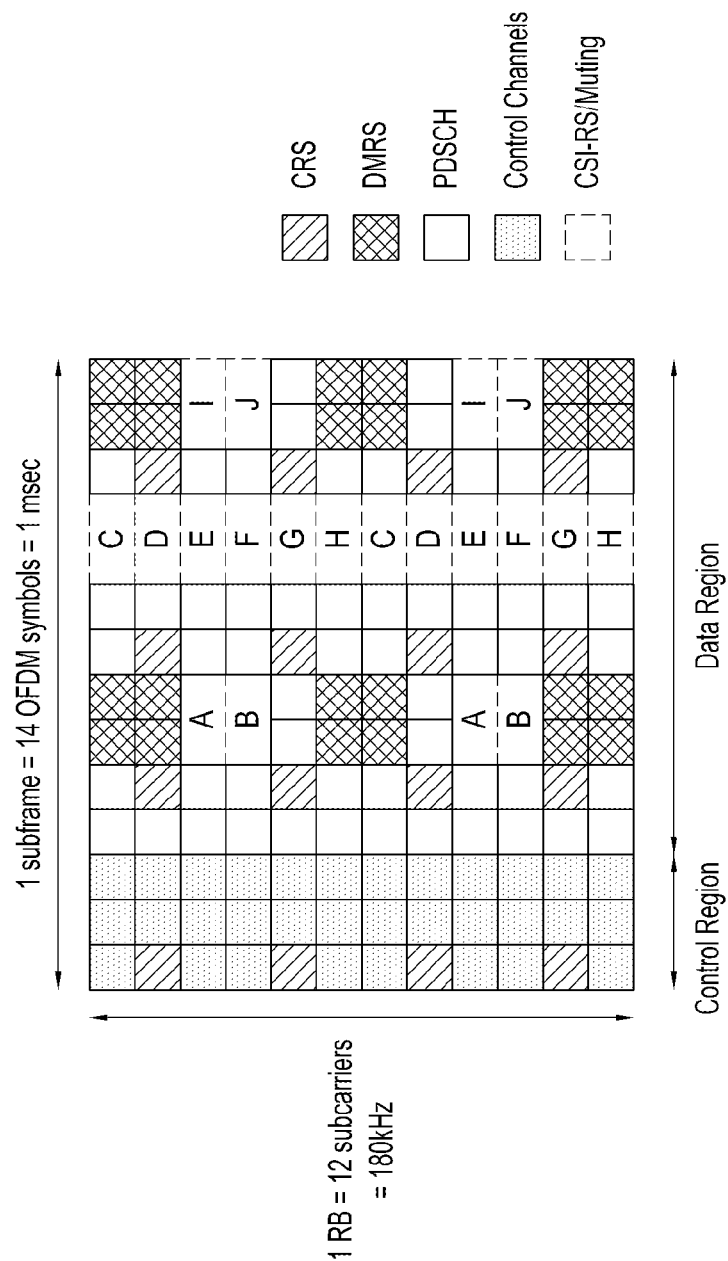
FIG. 2 is a diagram illustrating an example of a radio resource corresponding to one subframe and one Resource Block (RB), which are the minimum units for downlink scheduling in an LTE/LTE-A system to which an embodiment of the present disclosure is applied.

FIG. 2 is a diagram illustrating an example of a radio resource corresponding to one subframe and one Resource Block (RB), which are the minimum units for downlink scheduling in an LTE/LTE-A system to which an embodiment of the present disclosure is applied.

Referring to FIG. 2, the radio resources may be configured based on a subframe unit in the time axis, and a Resource Block (RB) unit in the frequency axis. Such radio resource may include 12 subcarriers in the frequency domain, and 14 OFDM symbols in the time domain, whereby a total of 168 unique frequency-and-time positions.

In the LTE/LTE-A, each unique frequency-and-time position illustrated in FIG. 2 is referred to as a Resource Element (RE).

The following several different types of signals may be transmitted in the radio resource illustrated in FIG. 2.

CRS (Cell Specific RS): The CRS is a reference signal transmitted based on a predetermined period to UEs located in one cell, and is used in common by the UEs located in the corresponding cell.

Demodulation Reference Signal (DMRS): The DMRS is a reference signal transmitted for a specific UE, and is transmitted only when data is transmitted to the corresponding UE. The DMRS is formed of a total of 8 DMRS ports. In LTE/LTE-A, ports 7 to 14 correspond to the DMRS ports and the ports may maintain orthogonality to not cause interference to one another using Code Division Multiplexing (CDM) or Frequency Division Multiplexing (FDM).

Physical Downlink Shared Channel (PDSCH): the PDSCH is a data channel transmitted via a downlink, which is used by an eNB to transmit traffic to a UE, and is transmitted using an RE that is not used for reference signal transmission in the data region of FIG. 2.

CSI-RS (Channel Status Information Reference Signal): The CSI-RS is a reference signal transmitted to UEs located in one cell, and is used by corresponding UEs to measure a channel status. A plurality of CSI-RSs may be transmitted to one cell.

Other control channels (PHICH, PCFICH, PDCCH): The control channels are used to provide control information required when a UE receives a PDSCH, or to transmit ACK/NACK for operating Hybrid Automatic Repeat Request (HARD) with respect to uplink data transmission.

The LTE-A system may set muting, except for the above-described signals, so as to prevent a CSI-RS transmitted from another eNB from being received as interference by UEs in the corresponding cell. Muting may be applied to a location where the CSI-RS may be transmitted, and generally, a UE may skip the corresponding radio resources and receive a traffic signal. In the LTE-A system, muting is also referred to as zero-power CSI-RS. In other words, at the location of a CSI-RS to which muting is applied, transmission power may not be transmitted.

In FIG. 2, a CSI-RS expressed as a broken-line box may be transmitted using some of the locations expressed as A, B, C, D, E, E, F, G, H, I, and J, based on the number of antennas that transmit a CSI-RS. Also, muting may be applied to some of the locations expressed as A, B, C, D, E, E, F, G, H, I, and J. Particularly, a CSI-RS may be transmitted via 2, 4, and 8 REs, based on the number of antenna ports (APs) that execute transmission. Referring to FIG. 2, when the number of APs is 2, a CSI-RS is transmitted via half of a predetermined pattern. When the number of APs is 4, a CSI-RS is transmitted via the whole of the predetermined pattern. When the number of APs is 8, a CSI-RS is transmitted using two patterns. Conversely, muting is always executed based on a single pattern. That is, muting may be applied to a plurality of patterns but may not be applied to some of a single pattern when the location does not overlap a CSI-RS. However, when the location of muting and the location of a CSI-RS overlap, muting may be applied to some of a single pattern.

When a CSI-RS for two APs is transmitted, a signal of each AP may be transmitted in two REs which are connected in the time axis, and the signal of each AP may be distinguished based on an orthogonal code. This indicates that two CSI-RS ports are multiplexed according to CDM-2. When a CSI-RS for four APs is transmitted, two more REs may be used to transmit signals of two other APs in the same manner, in addition to the CSI-RS for two APs. In this instance, a RE pair which is multiplexed according to CDM-2 is located in the same OFDM symbol, and is multiplexed according to FDM. In the same manner as what has described above, when a CSI-RS for eight APs is transmitted, two RE pairs which are multiplexed according to CDM-2 are multiplexed according to FDM.

Figure 3:
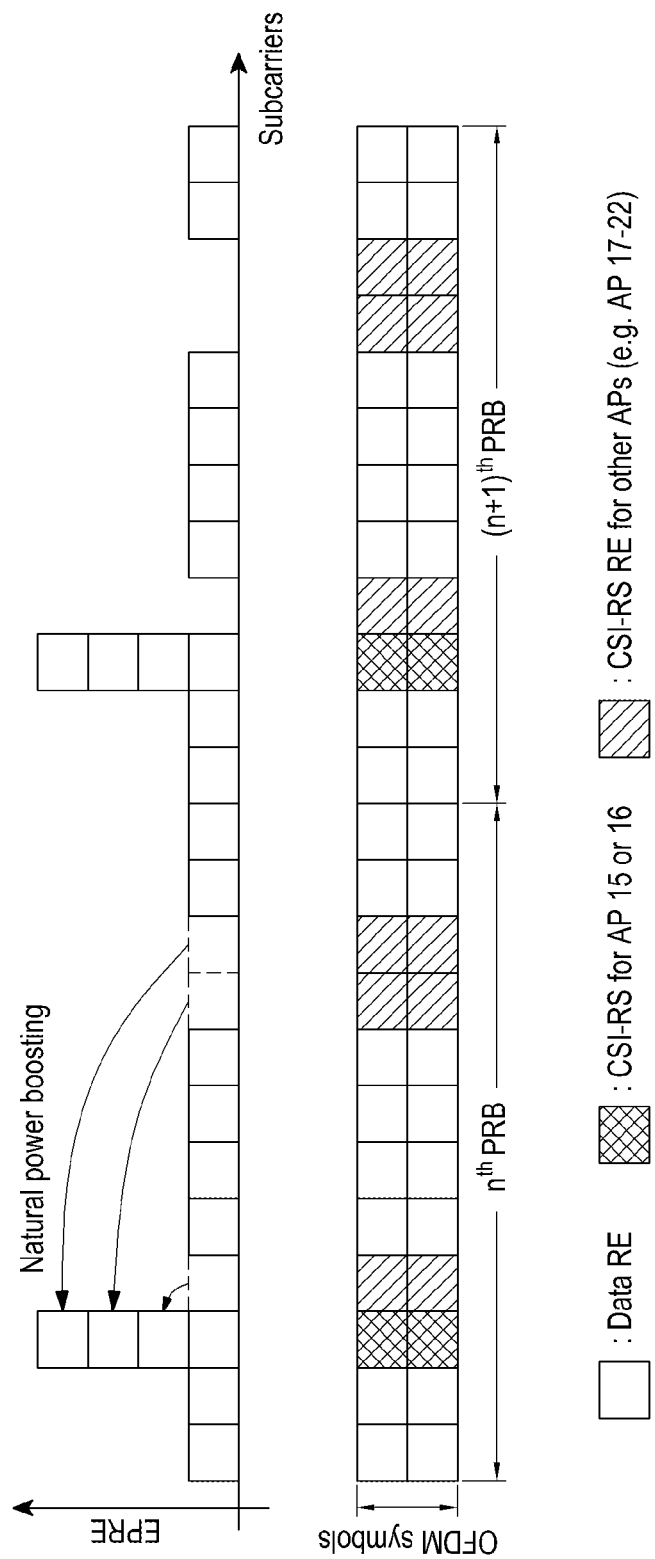
FIG. 3 is a diagram illustrating an example of CSI-RS RE mapping associated with $n^{th}$ and $n+1^{th}$ Physical Resource Blocks (PRBs) when an evolved NodeB (eNB) transmits eight CSI-RSs in an LTE/LTE-A system to which the present disclosure is applicable.

An eNB may boost transmission power of a CSI-RS in order to improve channel estimation accuracy. When a CSI-RS for four or eight APs is transmitted, a predetermined CSI-RS port may be transmitted in a CSI-RS RE located in a predetermined position, and may not be transmitted in an OFDM symbol other than the same OFDM symbol. FIG. 3 is a diagram illustrating an example of CSI-RS RE mapping in $n^{th}$ and $n+1^{th}$ Physical Resource Blocks (PRBs) when an eNB transmits eight CSI-RSs in an LTE/LTE-A system to which the present disclosure is applicable.

Referring to FIG. 3, AP #15 or #16, and APs #17 to #22 are all allocated to the same OFDM symbol. Here, when the CSI-RS RE position for AP #15 or #16 is the same as a checked pattern of FIG. 3, the CSI-RS REs for the remaining AP #17 to #22, which are expressed by an oblique pattern, may not use the transmission power of AP #15 or #16. Therefore, as illustrated in FIG. 3, in an $n^{th}$ PRB, AP#15 or #16 may use transmission power, which is to be used for $3^{rd}$, $8^{th}$, and $9^{th}$ subcarriers to which APs#17 to #22 are allocated, for a subcarrier allocated to AP#15 or #16, that is, subcarrier #2, wherein the APs#17 to #22 are assigned with the same OFDM symbol as those of the AP#15 or 16. In the same manner, in a $(n+1)^{th}$ PRB, AP#15 or #16 may use transmission power, which is to be used for $15^{th}$, $20^{th}$, and $21^{st}$ subcarriers to which AP#17 to #22 are allocated, for a subcarrier allocated to AP#15 or #16, that is subcarrier#14, wherein the APs#17 to #22 are assigned with the same OFDM symbol as the AP#15 or 16.

Natural power boosting as described above may enable that the power of CSI-RS port #15 transmitted via subcarrier #2 is set to be a maximum of 6 dB higher than the transmission power of AP #15 used in a data RE. Current 2/4/8 port CSI-RS patterns are capable of performing natural power boosting of 0/2/6 dB, respectively. Each AP is capable of transmitting a CSI-RS by fully utilizing available power (full power utilization) via power boosting.

Also, a UE may be assigned with a CSI-Interference Measurement (CSI-IM) or CSI-Interference Measurement Resources (CSI-IMR), together with a CSI-RS. The CSI-IM resources may have the same resource structure and the same resource locations as those of a CSI-RS that supports 4 ports. The CSI-IM is a resource used when a UE that receives data from one or more eNBs accurately measures interference from a neighboring eNB. Particularly, the UE may measure, using a CSI-IM/IMR, the amount of interference from the neighboring eNB for the case in which data is transmitted and the case in which data is not transmitted. In this instance, the eNB may configure a CSI-RS and two CSI-IM resources. Also, the eNB may perform configuration such that the neighboring eNB always transmits a signal using one of the two CSI-IM resources, and does not always transmit a signal using the remaining CSI-IM resource. Accordingly, the amount of interference from the neighboring eNB may be efficiently measured.

In a cellular system, the eNB needs to transmit an RS to a UE so as to measure a downlink channel status. In the case of an LTE-A system of 3GPP, a UE measures a channel status between an eNB and the UE using a CRS or a CSI-RS transmitted by the eNB. In association with the channel status, several factors need to be basically considered, and the present specification assumes that the amount of interference in a downlink may be included therein. The amount of interference in a downlink may include an interference signal, a thermal noise, and the like, attributable to transmission by a transmission antenna that belongs to a neighboring eNB, which is important when a UE determines the channel status of the downlink. For example, when the transmission antenna of an eNB transmits a signal to a UE equipped with one reception antenna, the UE may receive a reference signal transmitted from the eNB, may determine energy that may be received per symbol in a downlink and the amount of interference that is to be received in parallel during an interval for receiving a corresponding symbol, based on the received reference signal, and may determine a ratio of symbol energy to interference (Es/Io). Here, the determined Es/Io may be converted to a data transmission speed or a value corresponding thereto, and may be reported to the eNB in the form of a Channel Quality Indicator (CQI), whereby the eNB may determine a data transmission speed in a downlink to be used for transmission to the UE.

In the case of the LTE-A system, the UE feeds back information associated with a channel status of a downlink to the eNB so that the eNB utilizes the same for downlink scheduling. That is, the UE measures a reference signal that the eNB transmits in a downlink, and feeds back information obtained based on the measured reference signal to the eNB in a form defined in the LTE/LTE-A standard. In LTE/LTE-A, information that the UE feeds back briefly includes the following three types of information.

Rank Indicator (RI): the number of spatial layers that a UE may receive in the current channel status Precoder Matrix Indicator (PMI): an indicator associated with a precoding matrix that a UE prefers in the current channel status Channel Quality Indicator (CQI): the maximum data rate that a UE can have in the current channel status, wherein the CQI may be replaced with an SINR, the maximum error correction code rate and modulation scheme, a data rate per frequency, or the like, which may be utilized in a similar manner as the maximum data rate.

The RI, PMI, and CQI are interrelated. For example, a precoding matrix supported in LTE/LTE-A may be defined to be different for each rank. Therefore, although the PMI value when the RI is 1 and the PMI value when the RI is 2 are the same, the PMI values are interpreted differently. Also, it is assumed that a rank value and a PMI value reported to the eNB when the UE determines a CQI are applied by the eNB. That is, in the case in which the UE feeds back, to the eNB, feedback information including RI_X, PMI_Y, and CQI_Z, this may indicate that the UE may perform reception at a data rate corresponding to CQI_Z when a rank is RI_X and a precoding is PMI_Y. As described above, the UE assumes a detailed transmission scheme to be executed by the eNB when calculating a CQI, so that the UE may reach optimal performance when the eNB actually executes transmission using the corresponding transmission scheme.

In order for the generation and reporting of the channel information, an eNB that has a massive antenna may need to configure an RS resource for measuring eight or more antenna channels and may perform transmission to a UE. As illustrated in FIG. 2, a maximum of 48 REs may be used as an available CSI-RS resource. However, the current system may configure a maximum of eight CSI-RSs for each cell. Therefore, in order to support a FD-MIMO system that operates based on eight or more CSI-RS ports, a new CSI-RS configuration method is required.

Particularly, in order to support a FD-MIMO including Uniform Planar Array (UPA) antenna ports, configuring eight or more CSI-RSs is essential. To configure the eight or more CSI-RS ports, various numbers of CSI-RSs may be configured using previously defined one CSI-RS port pattern or a combination of previously defined 2, 4, or 8 CSI-RS port pattern. When eight or more CSI-RS ports are configured, the same CSI-RS power boosting may be applied for each AP so as to accurately estimate a channel. In this instance, to perform the same CSI-RS power boosting for each AP, it is preferable to use a combination in which the same number of CSI-RS ports are arranged for each OFDM symbol. However, when various types of CSI-RS pattern combinations are used by taking into consideration a CSI-RS pattern reuse factor, it is difficult to configure a combination in which the same number of CSI-RS ports are arranged for each OFDM symbol in some combinations. Accordingly, a channel estimation performance may deteriorate.

Therefore, hereinafter, the present disclosure will suggest a method and a device for allocating a resource for accurate channel measurement in a wireless communication system that uses a massive antenna and for transmitting the allocated resource to a UE, whereby more accurate channel status information is generated and reported. For ease of description, an embodiment of the present disclosure will be described from the perspective of a FD-MIMO system based on LTE-A, but the embodiment of the present disclosure may not be limited to the corresponding system.

In the embodiment of the present disclosure, when eight or more CSI-RS ports are configured, a zero-power (ZP) CSI-RS may be used for power boosting of a non-zero power (NZP) CSI-RS, whereby the same CSI-RS power boosting may be applied for each AP.

Accordingly, the embodiment of the present disclosure may provide a method and a device for applying the same power boosting to all CSI-RS ports irrespective of a method of configuring a NZP CSI-RS, by reporting, by an eNB, zero-power (ZP) CSI-RS configuration information together when the eNB reports configuration information of a plurality of non-zero power (NZP) CSI-RSs to a UE in a FD-MIMO system.

Particularly, in the FD-MIMO system according to the embodiment of the present disclosure, the eNB includes eight or more antennas, configures an RS resource to be used for the corresponding UE to measure channels for the eight or more antennas of the eNB, and transmit information associated with the configured RS resource to the UE. In this instance, the number of RSs transmitted by the eNB may vary based on an antenna configuration and measurement type of the eNB.

Figure 4:
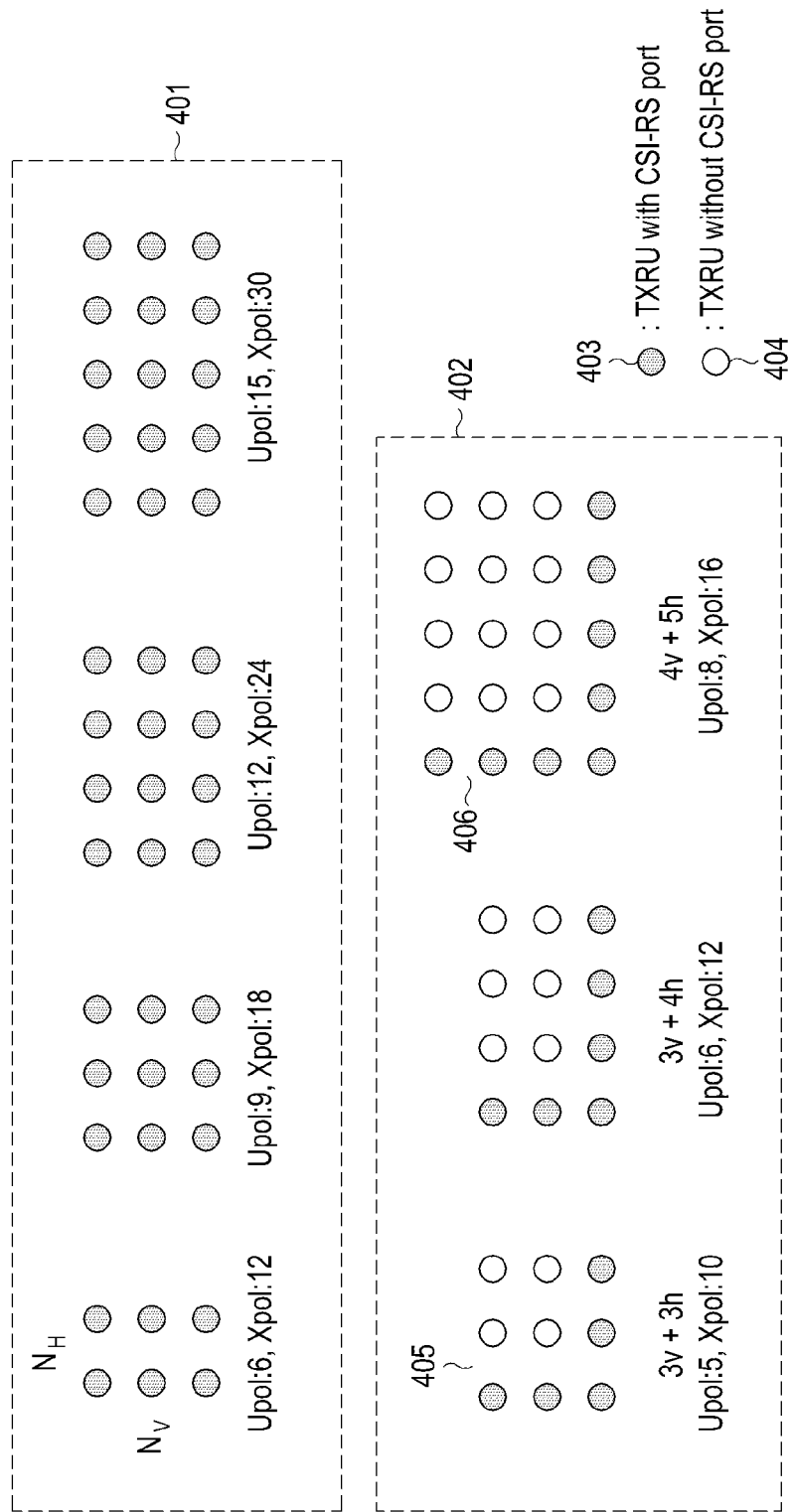
FIG. 4 is a diagram illustrating an example of a CSI-RS configuration according to an antenna configuration and measurement type in a massive MIMO system.

FIG. 4 is a diagram illustrating an example of a CSI-RS configuration according to an antenna configuration and measurement type in a massive MIMO system.

Referring to FIG. 4, diagram 401 indicates the number of CSI-RSs for full measurement that estimates CSI-RS ports for all transceiver units (TXRUs) used for data transmission of an eNB. Here, it is recognized that various numbers of CSI-RSs may be transmitted depending on the number of ports of the eNB in the horizontal direction, the number of ports in the vertical direction, and whether a polarization antenna is applied to a corresponding AP. When the polarization antenna is applied to a corresponding AP, two polarization APs may be applied to one AP. Particularly, in a first example of diagram 401, it is assumed that the number of ports in the horizontal direction is 2 and the number of ports in the vertical direction is 3. When a polarization antenna is not applied to all of six APs (co-polarization, Upol), the UE receives a CSI-RS only via six APs. Accordingly, the UE is configured such that channel estimation is executed six times. When a polarization antenna is applied to the APs (cross-polarization, Xpol), the UE receives a CSI-RS via polarization APs, wherein two polarization APs are applied for each of the six APs. Accordingly, the UE is configured such that channel estimation is executed a total of 12 times. In the same manner, in another example of diagram 401, when a polarization antenna is not applied to the total APs, the UE may be configured to perform channel estimation a number of times corresponding to the total number of APs. When a polarization antenna is applied, the UE may be configured to perform channel estimation a number of times that is double the total number of APs.

Diagram 402 indicates the number of CSI-RSs for partial measurement that estimates CSI-RS ports for some TXRUs from among the TXRUs used for data transmission. In the case of diagram 402, all TXRUs may be configured to include a TX-RU 403 to which a CSI-RS is allocated and a TX-RU 404 to which a CSI-RS is not allocated. Diagram 402 has been described as an example of CSI-RS puncturing, but a pattern in which channel estimation is omitted may not be limited to diagram 402.

As shown in diagram 402, channel estimation for some TX-RUs may have an estimation error higher than that of channel estimation for all TX-RUs. However, the amount of the CSI-RS resource may be significantly reduced. Diagram 405 illustrates the case in which the number of ports in the horizontal direction is 3 and the number of ports in the vertical direction is 3. Also, diagram 405 indicates the case in which the CSI-RS resource is allocated to 5 APs from among a total of 9 APs. Accordingly, when a UE performs partial channel estimation using a total of 5 CSI-RSs, the UE may determine channel direction information in the horizontal direction using three horizontal direction ports from among the APs to which the CSI-RS resource is allocated, and may determine channel direction information in the vertical direction using three vertical direction ports. When a polarization antenna is applied to partial estimation as shown in diagram 402, the UE may be configured to perform channel estimation a number of times that is double the number of some APs to which the CSI-RS resource is allocated. However, in the case in which a large-scale array and a polarization antenna are used as shown in diagram 406, it is recognized that a large number of CSI-RSs are allocated although channel estimation is performed for some of the whole APs.

Therefore, the embodiment of the present disclosure suggests a new CSI-RS configuration method for supporting the FD-MIMO system by taking into consideration the maximum number of CSI-RSs (8 CSI-RSs) allowed for each eNB.

First, the embodiment of the present disclosure may set a single CSI process including a plurality of CSI-RS configurations for configuring eight or more CSI-RSs.

Figure 5:
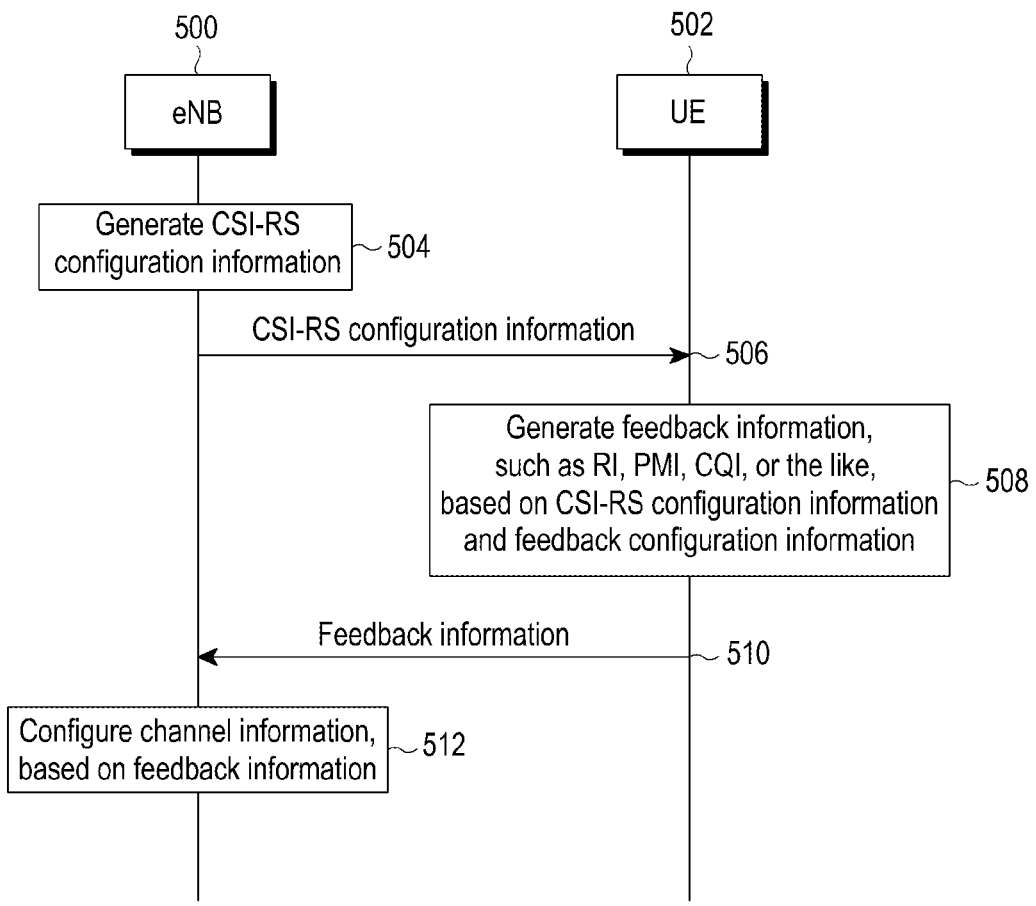
FIG. 5 is a diagram illustrating an example of performing channel estimation with respect to eight or more CSI-RS ports, and generating and reporting feedback information, based on a single CSI process including a plurality of CSI-RS configurations according to an embodiment of the present disclosure.

FIG. 5 is a diagram illustrating an example of performing channel estimation with respect to eight or more CSI-RS ports, and generating and reporting feedback information, based on a single CSI process including a plurality of CSI-RS configurations according to an embodiment of the present disclosure.

Referring to FIG. 5, in operation 504, a base station 500 may configure a CSI process to include eight or more CSI-RS ports, as an example of a plurality of CSI-RS ports, and may generate CSI-RS configuration information including the configuration information thereof. According to an embodiment of the present disclosure, the CSI-RS configuration information may include the RE positions of the configured CSI-RS ports, a configuration pattern of the CSI-RS ports, information related to an existing CSI-RS group, and the like. Here, the information related to the existing CSI-RS group may further include ZP CSI-RS configuration information that is configured in association with NZP CSI-RS configuration, so as to apply uniform CSI-RS power boosting, which will be described with reference to FIGS. 7a and 7b to FIG. 10.

In operation 506, the eNB 500 transmits the CSI-RS configuration information to a UE 502.

The UE 502 generates feedback information, such as an RI, a PMI, a CQI, and the like, based on the CSI-RS configuration information and feedback configuration information received in advance from the eNB 500 in operation 508, and may report the same to the eNB 500 in operation 510. In operation 512, the eNB 500 may configure, based on the feedback information, the rank and direction associated with a channel using one or more RIs and PMIs according to a predetermined rule. The channel quality may be configured with multiple CQIs. Here, a plurality of CSI-RSs are directly connected to one piece of feedback configuration information and, thus, channel quality may be configured with one CQI without newly defining a joint CQI.

In the embodiment of the present disclosure, eight or more CSI-RS ports may be configured by combining a plurality of CSI-RS configurations. That is, one 16-port CSI-RS pattern may be configured by combining 2, 4, or 8 port CSI-RS patterns.

Figure 6:
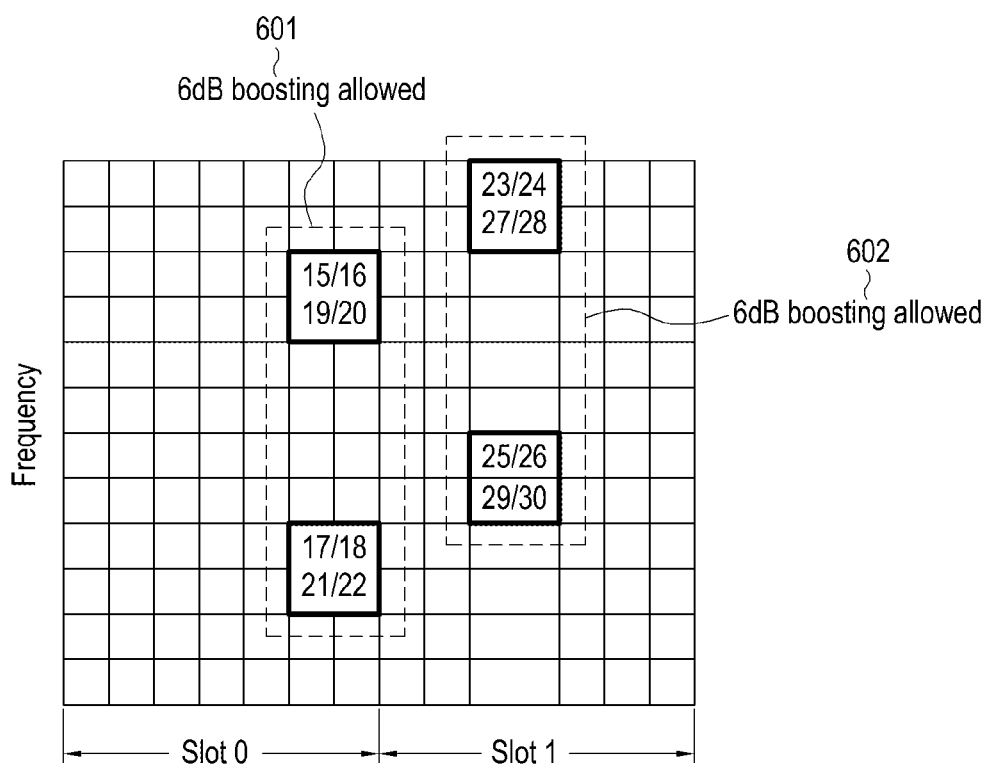
FIG. 6 is a diagram illustrating an example of a method of configuring eight or more CSI-RS ports by combining a plurality of CSI-RS configurations in an LTE/LTE-A system to which the present disclosure is applicable.

FIG. 6 is a diagram illustrating an example of a method of configuring eight or more CSI-RS ports by combining a plurality of CSI-RS configurations in an LTE/LTE-A system to which the present disclosure is applicable.

Referring to FIG. 6, diagram 601 and diagram 602 indicate the case in which a 8-port CSI-RS pattern is configured using, for example, combinations of 4-port CSI-RS patterns. However, the present disclosure may configure a plurality of port CSI-RS patterns, for example, a 8-port CSI-RS pattern, a 16-port CSI-RS pattern, or the like using combinations of 2 or 4-port CSI-RS pattern.

In the case of diagram 601, CSI-RS ports #15 to 22 are located in $5^{th}$ and $6^{th}$ OFDM symbols of slot #0. That is, the CSI-RS ports #15 to 16 and #19 to 20 and the CSI-RS ports #17 to 18 and #21 to 22, which are located in the $5^{th}$ and $6^{th}$ OFDM symbols of slot #0, are located in different subcarriers. In this instance, the CSI-RS ports #15 to 16 and #19 to 20 may use the power to be used by the CSI-RS ports #17 to 18 and #21 to 22 which are located at the same OFDM symbols, or the CSI-RS ports #17 to 18 and #21 to 22 may use the power to be used by the CSI-RS ports #15 to 16 and #19 to 20 which are located at the same OFDM symbols, whereby 6 dB natural power boosting may be applied when CSI-RS transmission to a UE is performed.

In the same manner, in diagram 602, CSI-RS ports #23 to 30 are located in $2^{nd}$ and $3^{rd}$ OFDM symbols of slot #1. That is, the CSI-RS ports #23 to 24 and #27 to 28 and the CSI-RS ports #25 to 26 and #29 to 30, which are located in the $2^{nd}$ and $3^{rd}$ OFDM symbols of slot #1, are located in different subcarriers. In this instance, the CSI-RS ports #23 to 24 and #27 to 28 may use the power to be used by the CSI-RS ports #25 to 26 and #29 to 30 which are located in the same OFDM symbols, or the CSI-RS ports #25 to 26 and #29 to 30 may use the power to be used by the CSI-RS ports #23 to 24 and #27 to 28 which are located in the same OFDM symbols, whereby 6 dB natural power boosting may be applied when CSI-RS transmission to a UE is performed. In the case of FIG. 6, all CSI-RS ports are transmitted at uniform power and, thus, channel estimation performance may not deteriorate by a predetermined port.

Figure 7A:
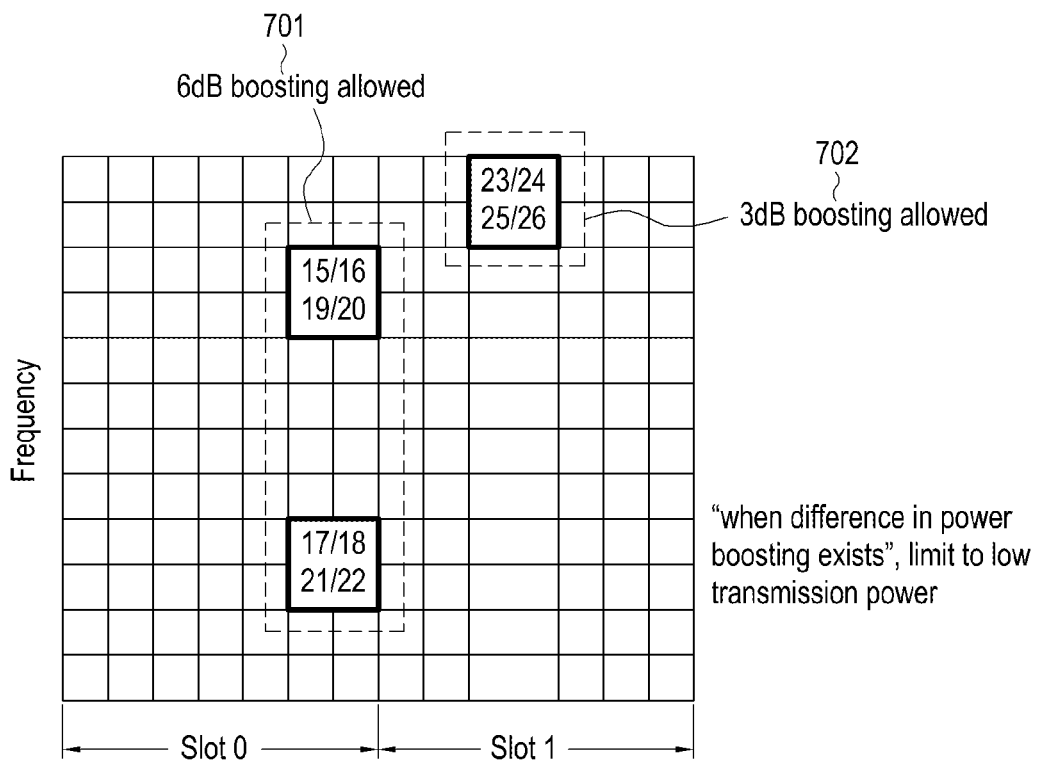
FIGS. 7a and 7b are diagrams illustrating other examples of a method of configuring eight or more CSI-RS ports by combining a plurality of CSI-RS configurations in an LTE/LTE-A system to which the present disclosure is applicable.
Figure 7B:
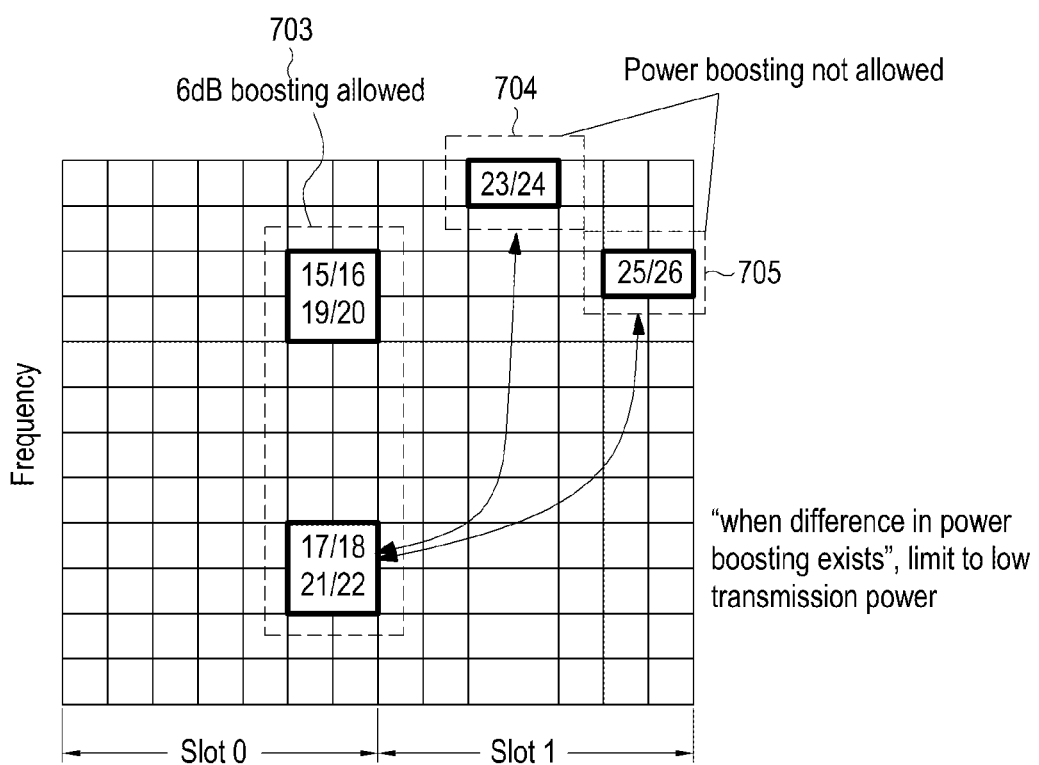

FIGS. 7a and 7b are diagrams illustrating another example of a method of configuring eight or more CSI-RS ports by combining a plurality of CSI-RS configurations in an LTE/LTE-A system to which the present disclosure is applicable.

Referring to FIGS. 7a and 7b, a port CSI-RS pattern may be configured by combining different port CSI-RS patterns. For example, diagram 701 and diagram 703 illustrate a 8-port CSI-RS pattern configured by combining 4-port CSI-RS patterns. However, according to other embodiments, various 8-port CSI-RS patterns and 16-port CSI-RS patterns may be configured using 2 or 4-port CSI-RS pattern.

Referring to FIG. 7a, in the case of diagram 701, CSI-RS ports #15 to 22 are located in $5^{th}$ and $6^{th}$ OFDM symbols of slot #0. That is, the CSI-RS ports #15 to 16 and #19 to 20 and the CSI-RS ports #17 to 18 and #21 to 22 are located in different subcarriers. In this instance, the CSI-RS ports #15 to 16 and #19 to 20 may use the power to be used by the CSI-RS ports #17 to 18 and #21 to 22 which are located in the same OFDM symbols, or the CSI-RS ports #17 to 18 and #21 to 22 may use the power to be used by the CSI-RS ports #15 to 16 and #19 to 20 which are located in the same OFDM symbols, whereby 6 dB natural power boosting may be applied when CSI-RS transmission to a UE is performed.

In the case of diagram 702, CSI-RS ports #23 to 26 are located in $2^{nd}$ and $3^{rd}$ OFDM symbols of slot #1. That is, the CSI-RS ports #23 to 24 and the CSI-RS ports #25 to 26 are located in different subcarriers. In this instance, the CSI-RS ports #23 to 24 may use the power to be used by the CSI-RS ports #25 and 26 located in the same OFDM symbols, or the CSI-RS ports #25 and 26 may use the power to be used by the CSI-RS ports #23 and 24, whereby a maximum of 3 dB natural power boosting may be applied when CSI-RS transmission to a UE is performed. As illustrated in FIG. 7a, when a difference in power boosting exists between CSI-RS ports, the overall channel estimation performance may be limited by a CSI-RS port having low transmission power.

Referring to FIG. 7b, in the case of diagram 703, CSI-RS ports #15 to 22 are located in $5^{th}$ and $6^{th}$ OFDM symbols of slot #0. That is, CSI-RS ports #15 to 16 and #19 to 20 and CSI-RS ports #17 to 18 and #21 to 22 are located in different subcarriers. In this instance, the CSI-RS ports #15 to 16 and #19 to 20 may use the power to be used by the CSI-RS ports #17 to 18 and #21 to 22 which are located in the same OFDM symbols, or the CSI-RS ports #17 to 18 and #21 to 22 may use the power to be used by the CSI-RS ports #15 to 16 and #19 to 20 which are located in the same OFDM symbols, whereby 6 dB natural power boosting may be applied when CSI-RS transmission to a UE is performed.

In the case of diagram 704, CSI-RS ports #23 to 24 are located in $2^{nd}$ and $3^{rd}$ OFDM symbols of slot #1. In this instance, except for the CSI-RS ports #23 and 24, CSI-RS ports to which a different subcarrier is mapped do not exist in the $2^{nd}$ and $3^{rd}$ OFDM symbols of slot #1. In the same manner, in diagram 705, CSI-RS ports #25 and 26 are located in $5^{th}$ and $6^{th}$ OFDM symbols of slot #1. In this instance, except for the CSI-RS ports #25 and 26, CSI-RS ports to which a different subcarrier is mapped do not exist in the $5^{th}$ and $6^{th}$ OFDM symbols of slot #1. Therefore, in diagrams 704 and 705, natural power boosting may not be applicable. Accordingly, the CSI-RS ports #23 to 26 in diagrams 704 and 705 may be incapable of obtaining a channel estimation performance gain via power boosting and, thus, the overall channel estimation performance may be limited by the ports in diagrams 704 and 705 where natural power boosting is not applicable.

An eNB may define a ratio of a CSI-RS Energy per RE (CSI-RS EPRE) to a PDSCH EPRE as Pc, for a UE to calculate a CQI, and may report Pc to the UE. Here, Pc is calculated by assuming that transmission power of all CSI-RS ports are the same. In this instance, in the case in which unbalanced power boosting is applied as shown in FIG. 7, a different Pc value needs to be configured for each CSI-RS port or CSI-RS port transmission power boosting needs to be limited based on Pc having a lower value, to enable the UE to accurately calculate a CQI.

Therefore, hereinafter, an embodiment of the present disclosure will suggest a method of performing NZP CSI-RS configuration using a ZP CSI-RS configuration, so as to apply uniform CSI-RS power boosting. Particularly, an eNB according to the embodiment of the present disclosure set an OFDM symbol including the largest number of CSI-RS ports as a reference, and may configure a ZP CSI-RS for performing CSI-RS power boosting corresponding to CSI-RS power boosting applicable to the OFDM symbol that is set as the reference. Accordingly, the eNB according to the embodiment of the present disclosure may further configure a ZP CSI-RS for an OFDM symbol including a smaller number of NZP CSI-RSs, from among OFDM symbols via which an NZP CSI-RS is transmitted. In this instance, the eNB may not transmit a CSI-RS via the added ZP CSI-RS RE and, thus, may use the power to be used by the ZP CSI-RS RE as needed, so as to perform power boosting in an NZP CSI-RS. Accordingly, the magnitude of a ZP CSI-RS resource configured for CSI-RS power boosting according to the embodiment of the present disclosure may be determined to correspond to a power boosting level additionally required for CSI-RS power boosting applicable to the OFDM symbol set as the reference.

Figure 8A:
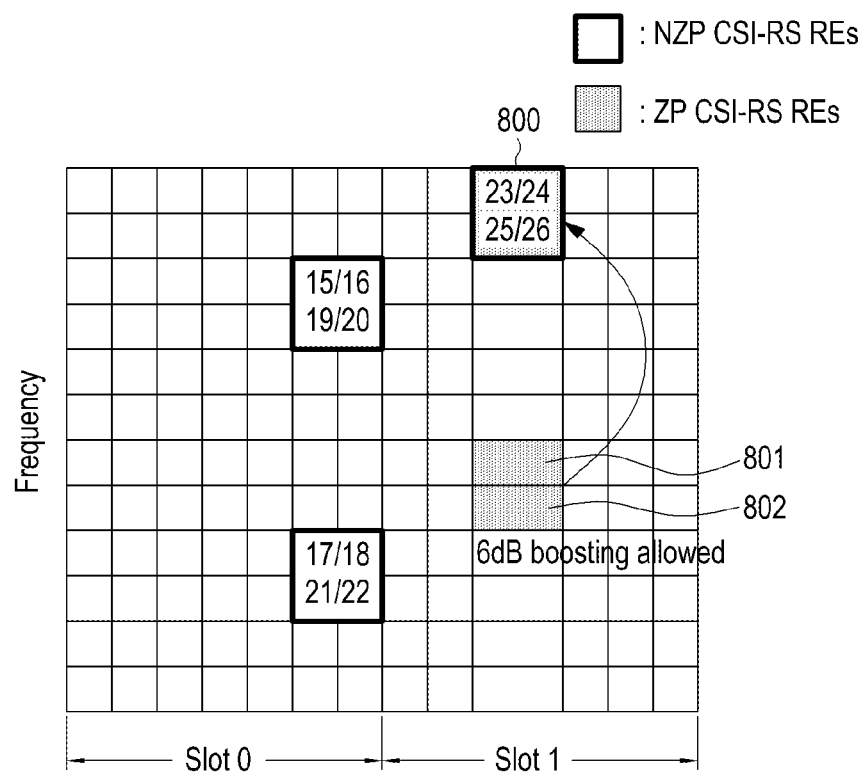
FIGS. 8a and 8b are diagrams illustrating examples of allocating a ZP CSI-RS resource for CSI-RS power boosting according to an embodiment of the present disclosure.
Figure 8B:
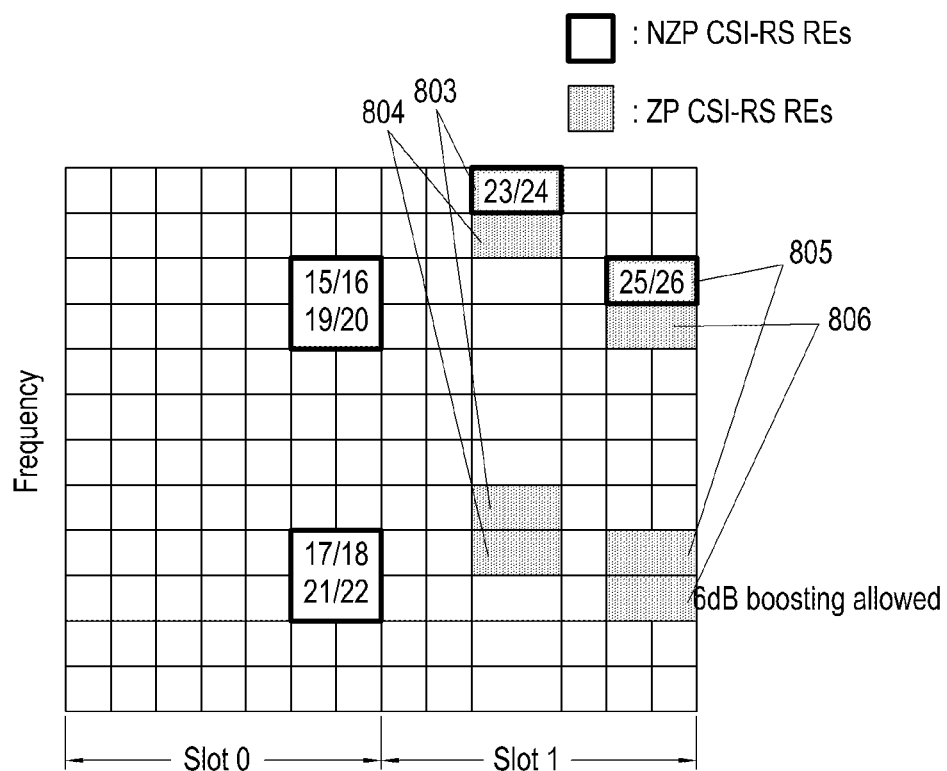

FIGS. 8*a* and 8*b* are diagrams illustrating examples of allocating a ZP CSI-RS resource for a CSI-RS power boosting according to an embodiment of the present disclosure.

Referring to FIG. 8*a*, it is assumed that an NZP CSI-RS resource is configured to be the same as diagram 701 and diagram 702. Accordingly, CSI-RS ports #15 to 22 are located in $5^{th}$ and $6^{th}$ OFDM symbols of slot #0. That is, CSI-RS ports #15 to 16 and #19 to 20 and CSI-RS ports #17 to 18 and #21 to 22 are located in different subcarriers. Diagram 800 shows that CSI-RS ports #23 to 24 and #25 to 26, which are located in $2^{nd}$ and $3^{rd}$ OFDM symbols of slot #1, are located in different subcarriers.

In this instance, the eNB according to an embodiment of the present disclosure may additionally configure ZP CSI-RSs for the $2^{nd}$ and $3^{rd}$ OFDM symbols of slot #1 to which APs corresponding to diagram 800 are allocated, for power boosting of the APs corresponding to diagram 800. Here, in the case of the CSI-RS ports #15 and 16, and #19 and 20, or the CSI-RS ports #17 and 18, and #21 and 22, 6 dB natural power boosting are applicable. In this instance, in the case of the CSI-RS ports #23 and 24, and #25 and 26 at the $2^{nd}$ and $3^{rd}$ OFDM symbols of slot #1, 3 dB natural power boosting is applicable as described in FIG. 7 and, thus, 3 dB power boosting may be additionally required for uniform power boosting. Accordingly, the eNB according to the embodiment of the present disclosure may configure ZP CSI-RSs for four ports located in different subcarriers, which respectively correspond to the CSI-RS ports #23 and 24 and the CSI-RS ports #25 and 26 in the $2^{nd}$ and $3^{rd}$ OFDM symbols of slot #1, as shown in diagrams 801 and 802, so as to correspond to the 4-port CSI-RS pattern, which is the basic unit for ZP CSI-RS allocation. The example of FIG. 8*a* illustrates the case in which a pattern of ports in which ZP CSI-RSs are configured and a pattern of CSI-RS ports #23 to 26 overlap. However, in the present embodiment, when a ZP CSI-RS resource pattern that needs to be configured for uniform power boosting does not overlap a previously allocated NZP CSI-RS resource pattern, a ZP CSI-RS is configured using a single 4-port CSI-RS pattern and additional 3 dB power boosting may be performed.

Referring to FIG. 8*b*, according to another embodiment, it is assumed that a NZP CSI-RS resource is configured to be the same as diagrams 703, 704, and 705 of FIG. 7. In this instance, the eNB may additionally configure ZP CSI-RSs for $2^{nd}$ and $3^{rd}$ OFDM symbols and $5^{th}$ and $6^{th}$ OFDM symbols of slot #1. In this instance, the eNB according to the embodiment of the present disclosure may additionally configure ZP CSI-RSs for $2^{nd}$ and $3^{rd}$ OFDM symbols and $5^{th}$ and $6^{th}$ OFDM symbols of slot #1. Here, in the case of CSI-RS ports #23 and 24 in the $2^{nd}$ and $3^{rd}$ OFDM symbols of slot #1, natural power boosting is not allowed and, thus, 6 dB power boosting is additionally needed for uniform power boosting. Accordingly, the eNB according to the embodiment of the present disclosure may configure ZP CSI-RSs located in different subcarriers, which respectively correspond to the CSI-RS ports #23 and 24 in the $2^{nd}$ and $3^{rd}$ OFDM symbols of slot #1, as shown in diagrams 803 and 804, so as to correspond to the 4-port CSI-RS pattern, which is the basic unit for ZP CSI-RS allocation. In the same manner, in the case of CSI-RS ports #25 and 26 in the $5^{th}$ and $6^{th}$ OFDM symbols of slot #1, natural power boosting is not allowed and, thus, 6 dB power boosting is additionally needed for uniform power boosting. Accordingly, the eNB according to the embodiment of the present disclosure may configure ZP CSI-RSs located in different subcarriers, which respectively correspond to the CSI-RS ports #25 and 26 in the $5^{th}$ and $6^{th}$ OFDM symbols of slot #1, as shown in diagrams 805 and 806, so as to correspond to the 4-port CSI-RS pattern, which is the basic unit for ZP CSI-RS allocation. Also in the example of FIG. 8*b*, a ZP CSI-RS is configured using the 4-port CSI-RS pattern as the basic unit. Accordingly, a ZP CSI-RS may be configured by taking into consideration whether a ZP CSI-RS resource pattern that needs to be configured for uniform power boosting overlaps an NZP CSI-RS resource pattern.

The examples of FIGS. 8*a* and 8*b* have described from the perspective of the situation in which the total number of allocable CSI-RS ports is 12. However, the number of allocable CSI-RS ports may not be limited thereto, and various numbers such as 10, 14, . . . , 64, and the like may be applicable.

The accuracy of channel estimation required may change according to a channel environment where a UE is located. For example, in the case of a UE located at a distance farther than a predetermined distance threshold value from an eNB, CSI-RS power boosting relatively higher than that of a UE located at a relatively short distance may be required so as to compensate pathloss. Conversely, in the case of a UE located at a distance closer than the predetermined distance threshold value from the eNB, pathloss may not be high and, thus, low-level CSI-RS power boosting may be required or CSI-RS power boosting may not be required in some instances. Therefore, the embodiment of the present disclosure may adaptively control a power boosting level according to the location of a UE. Accordingly, the eNB according to the embodiment of the present disclosure may be capable of configuring different ZP CSI-RSs according to a channel status of a UE.

Figure 9A:
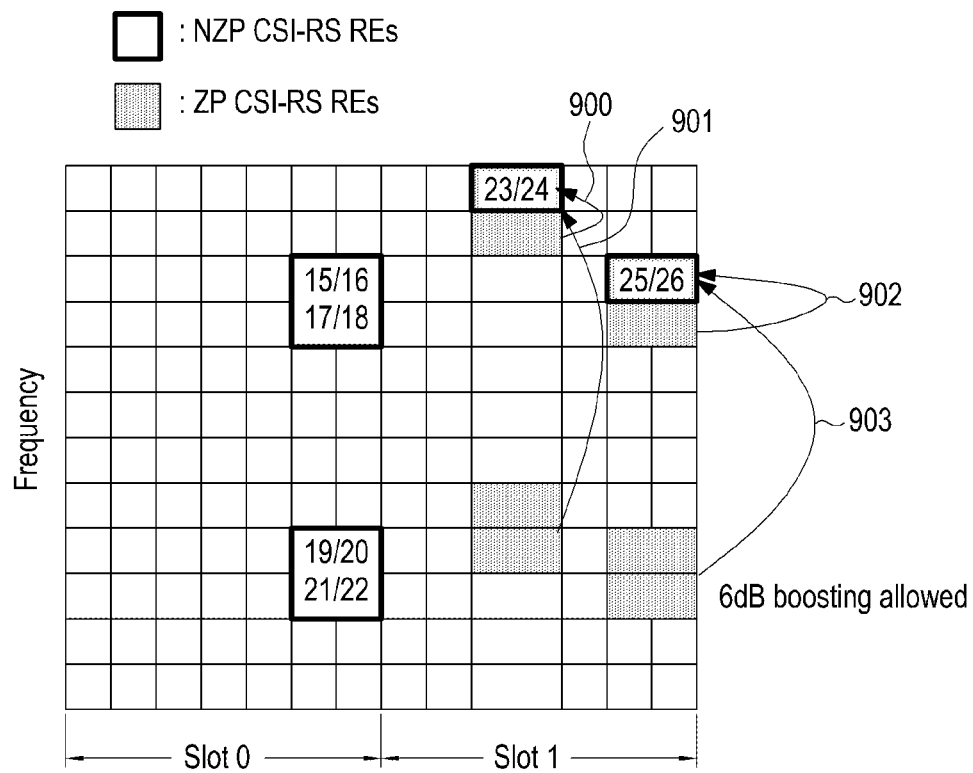
FIGS. 9a and 9b are diagrams illustrating examples of adaptively controlling an adaptive power boosting level corresponding to the location of a UE according to an embodiment of the present disclosure.
Figure 9B:
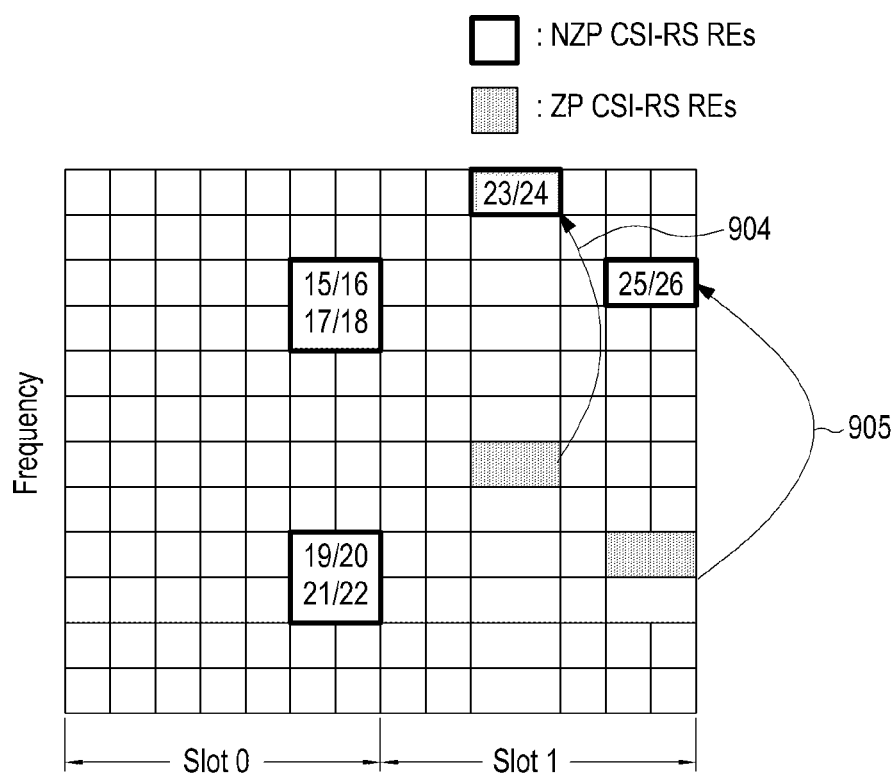

FIGS. 9a and 9b are diagrams illustrating examples of adaptively controlling an adaptive power boosting level corresponding to the location of a UE according to an embodiment of the present disclosure.

Referring to FIG. 9a, for example, a sufficient number of ZP CSI-RSs may be configured for a UE existing at a cell boundary of an eNB, so that the maximum power boosting is allowed. It is assumed that the eNB according to the embodiment of the present disclosure allocates CSI-RS ports #23 and 24 in the $2^{nd}$ and $3^{rd}$ OFDM symbol of slot #1 and CSI-RS ports #25 and 26 in the $5^{th}$ and $6^{th}$ OFDM symbols of slot #1, to the UE existing at the cell boundary. In this instance, the eNB may perform power boosting using the power to be used by the ZP CSI-RS resource configured as shown in diagrams 900 and 901 in the same OFDM symbols as those of the CSI-RS ports #23 and 24 of slot #1. In the same manner, the eNB may perform power boosting using the power to be used by the ZP CSI-RS resource configured as shown in diagrams 902 and 903 in the same OFDM symbols as those of the CSI-RS ports #25 and 26 of slot #1.

Referring to FIG. 9b, in the case of a UE existing in the center of the cell of an eNB, a relatively smaller number of ZP CSI-RSs than the case of FIG. 9a are configured, and loss of throughput may be minimized. Particularly, in the same manner as FIG. 9a, it is assumed that CSI-RS ports #23 and 24 in the $2^{nd}$ and $3^{rd}$ OFDM symbol of slot #1 and CSI-RS ports #25 and 26 in the $5^{th}$ and $6^{th}$ OFDM symbols of slot #1 are allocated to the UE existing at the center of the cell of the eNB. In this instance, the eNB may perform power boosting using the power to be used by the ZP CSI-RS resource configured as shown in diagram 904 in the same OFDM symbols as those of the CSI-RS ports #23 and 24 of slot #1. In the same manner, the eNB may perform power boosting using the power to be used by the ZP CSI-RS resource configured as shown in diagram 905 in the same OFDM symbols as those of the CSI-RS ports #25 and 26 of slot #1.

Figure 10:
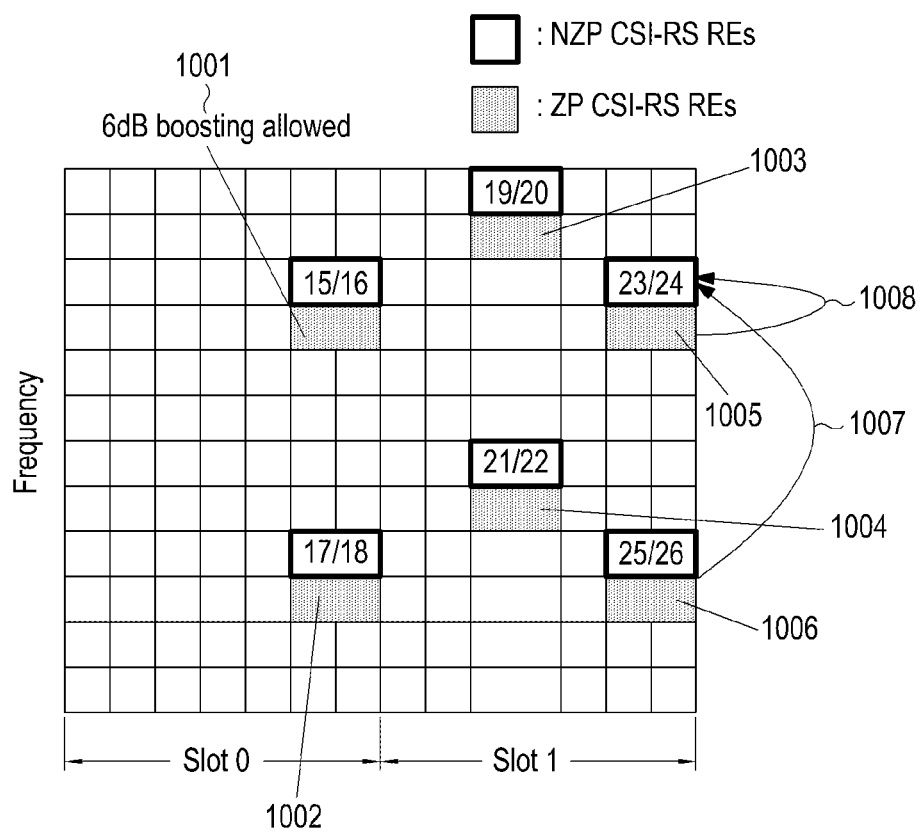
FIG. 10 is a diagram illustrating an example of additionally configuring a ZP CSI-RS to each of all NZP CSI-RS resources according to another embodiment of the present disclosure.

In another embodiment of the present disclosure, an eNB may additionally configure a ZP CSI-RS for all OFDM symbols including a CSI-RS, and may perform CSI-RS power boosting. FIG. 10 is a diagram illustrating an example of additionally configuring a ZP CSI-RS for each of all NZP CSI-RS resources according to another embodiment of the present disclosure.

Referring to FIG. 10, a ZP CSI-RS may be configured as shown in diagrams 1001 and 1002, for CSI-RS ports #15 and 16, and CSI-RS ports #17 and 18 allocated to the same OFDM symbols of slot #0, according to an embodiment of the present disclosure. In the same manner, a ZP CSI-RS may be configured, as shown in diagrams 1003 and 1004, for CSI-RS ports #19 and 20 and CSI-RS ports #21 and 22 allocated in the same OFDM symbols of slot #1. In the same manner, a ZP CSI-RS may be configured, as shown in diagrams 1005 and 1006, for CSI-RS ports #23 and 24, and CSI-RS ports #25 and 26 allocated in other same OFDM symbols of slot #1. As described above, as a ZP CSI-RS is configured for each CSI-RS port as shown in diagrams 1001 to 1006, 6 dB power boosting is applicable with respect to all CSI-RS ports to which a maximum of 3 dB natural power boosting is applicable. For example, in the case of the CSI-RS ports #23 and 24 of slot #1, additional power boosting of 3 dB is applied using the power of the ZP CSI-RS configured as shown in diagrams 1007 and 1008, whereby a maximum of 6 dB power boosting may be applied.

Figure 11:
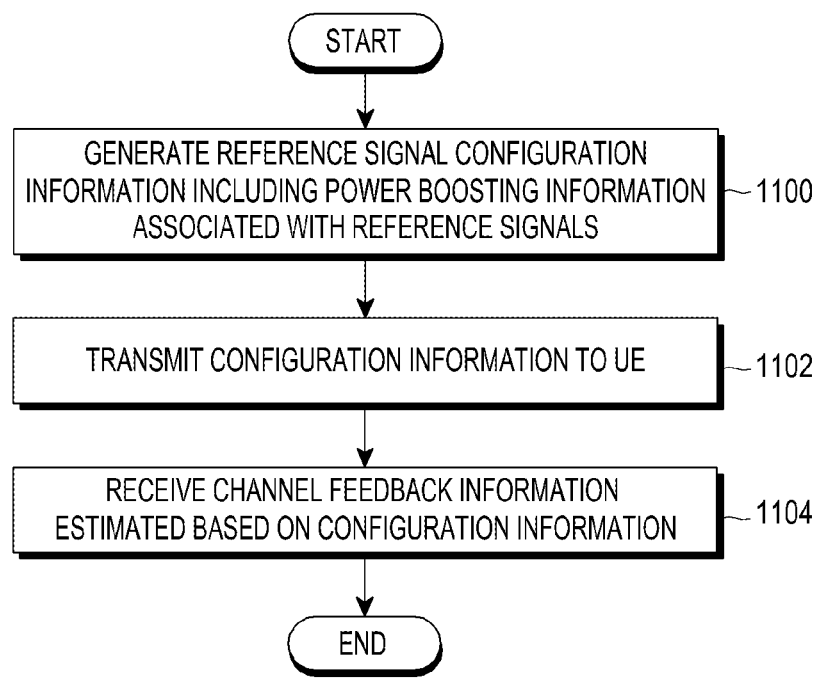
FIG. 11 is an example of a flowchart of operations of an eNB according to an embodiment of the present disclosure.

FIG. 11 is an example of a flowchart of operations of an eNB according to an embodiment of the present disclosure.

Referring to FIG. 11, an eNB generates reference signal configuration information including power boosting information of reference signals in operation 1100, and the eNB transmits the configuration information to a UE in operation 1102. Here, the reference signal configuration information may include a process of configuring at least one of resource information associated with at least eight antenna ports to which reference signals are allocated, pattern information associated with the at least eight antenna ports, and the same power boosting information of the reference signals allocated to the at least eight antenna ports. The reference signal configuration information including the power boosting information associated with reference signals according to the embodiment of the present disclosure are configured according to the descriptions which have been described with reference to FIGS. 8a and 8b to FIG. 10, and, thus, descriptions thereof will be omitted.

The eNB transmits the reference signal and receives channel feedback information obtained based on the configuration information from the UE in operation 1104.

Figure 12:
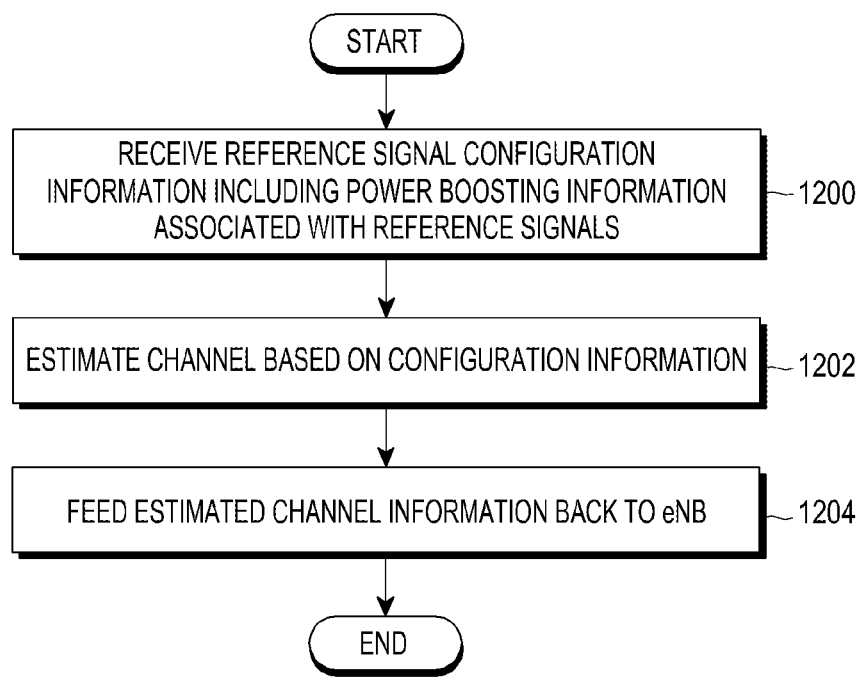
FIG. 12 is an example of a flowchart of operations of a UE according to an embodiment of the present disclosure.

FIG. 12 is an example of a flowchart of operations of a UE according to an embodiment of the present disclosure.

Referring to FIG. 12, in operation 1200, the UE receives reference signal configuration information including power boosting information associated with reference signals from an eNB. Here, the reference signal configuration information may include a process of configuring at least one of resource information associated with at least eight antenna ports to which reference signals are allocated, pattern information associated with the at least eight antenna ports, and the same power boosting information of the reference signals allocated to the at least eight antenna ports. The reference signal configuration information including the power boosting information associated with reference signals according to the embodiment of the present disclosure are configured according to the descriptions which have been described with reference to FIGS. 8a and 8b to FIG. 10, and, thus, descriptions thereof will be omitted.

The UE may estimate a channel, based on the configuration information in operation 1202, and may feed the estimated channel information back to the eNB in operation 1204.

Figure 13:
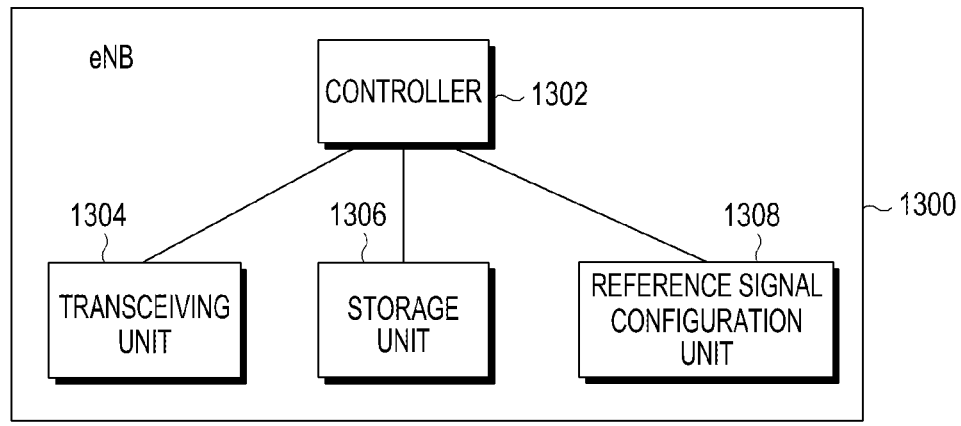
FIG. 13 is an example of the configuration of an eNB according to an embodiment of the present disclosure.

FIG. 13 is an example of the configuration of an eNB according to an embodiment of the present disclosure.

Referring to FIG. 13, an eNB 1300 may include, for example, a controller 1302, a transceiving unit 1304, a storage unit 1306, and a reference signal configuration unit 1308. The configuration of FIG. 13 is made as an example, and each element of the eNB may be configured as separate detailed elements or the elements may be configured in an integrated form according to an embodiment of the present disclosure or the intention of an operator.

The controller 1302 may control the overall operation of the eNB according to the embodiment of the present disclosure. The reference signal configuration unit 1308 may configure reference signal configuration information including power boosting information associated with reference signals, as shown in FIGS. 8a and 8b to FIG. 10, according to the control of the controller 1302. The controller 1302 may perform control such that the transceiving unit 1304 transmits the reference signal configuration information. The storage unit 1306 may store information configured by the eNB according to the embodiment of the present disclosure, or feedback information received from the UE.

Figure 14:
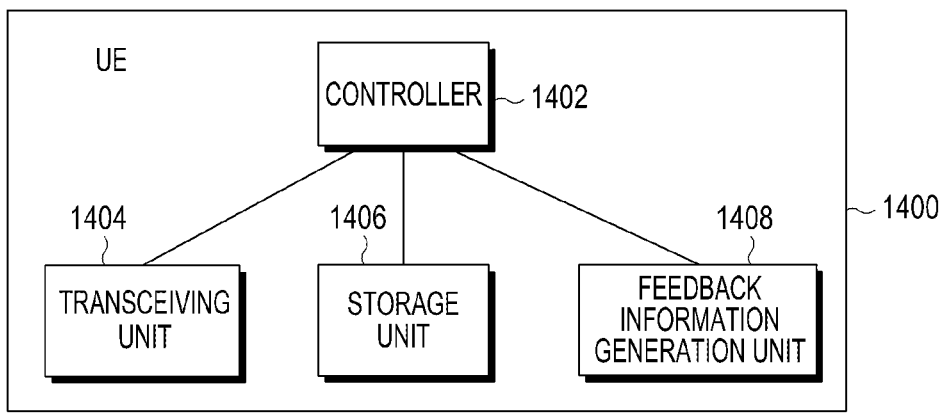
FIG. 14 is an example of the configuration of a UE according to an embodiment of the present disclosure.

FIG. 14 is an example of the configuration of a UE according to an embodiment of the present disclosure.

Referring to FIG. 14, a UE 1400 may include, for example, a controller 1402, a transceiving unit 1404, a storage unit 1406, and a feedback information generation unit 1408. The configuration of FIG. 14 is made as an example, and each element of the UE may be configured as separate detailed elements or the elements may be configured in an integrated form according to an embodiment of the present disclosure or the intention of an operator.

The controller 1402 may control the overall operation of the UE according to the embodiment of the present disclosure. The feedback information generation unit 1408 may estimate a channel, based on the reference signal configuration information including power boosting information associated with reference signals, as shown in FIGS. 8a and 8b to FIG. 10, and may configure feedback information associated with the estimated channel, according to the control of the controller 1402. The controller 1402 may perform control such that the transceiving unit 1304 transmits the feedback information. The storage unit 1306 may store feedback related information, the reference signal configuration information, or the like, received from the eNB according to the embodiment of the present disclosure.

Particular aspects of the present disclosure may be implemented as a computer-readable code in a computer-readable recording medium. The computer-readable recording medium is a predetermined data storage device which can store data which can be read by a computer system. Examples of the computer readable recording medium may include a read-only memory (ROM), a random access memory (RAM), a CD-ROM, a magnetic tape, a floppy disk, an optical data storage device, and a carrier wave (such as data transmission through the Internet). The computer-readable recording medium may be distributed through computer systems connected to the network, and accordingly the computer-readable code is stored and executed in a distributed manner. Further, functional programs, codes, and code segments to achieve the present disclosure may be easily interpreted by programmers skilled in the art.

It will be understood that a method and apparatus according to an embodiment of the present disclosure may be implemented in the form of hardware, software, or a combination of hardware and software. Any such software may be stored, for example, in a volatile or non-volatile storage device such as a ROM, a memory such as a RAM, a memory chip, a memory device, or a memory IC, or a recordable optical or magnetic medium such as a CD, a DVD, a magnetic disk, or a magnetic tape, regardless of its ability to be erased or its ability to be re-recorded. It will also be understood that a method and apparatus according to an embodiment of the present disclosure may be implemented by a computer or portable terminal including a controller and a memory, and the memory is an example of a machine readable device adapted to store a program or programs including instructions for implementing embodiments of the present disclosure.

Accordingly, the present disclosure includes a program including a code for implementing the apparatus or method described in any of the appended claims of the specification and a machine (computer or the like) readable storage medium for storing the program. Further, the program may be electronically carried by any medium such as a communication signal transferred through a wired or wireless connection, and the present disclosure appropriately includes equivalents thereof.

Further, an apparatus according to an embodiment of the present disclosure may receive the program from a program providing device that is wiredly or wirelessly connected thereto, and may store the program. The program providing device may include a program including instructions through which a program processing device performs a preset content protecting method, a memory for storing information and the like required for the content protecting method, a communication unit for performing wired or wireless communication with the program processing device, and a controller for transmitting the corresponding program to a transceiver at the request of the program processing device or automatically.

While the present disclosure has been shown and described with reference to certain embodiments thereof, it will be understood by those skilled in the art that various changes in form and details may be made therein without departing from the scope of the present disclosure. Therefore, the scope of the present disclosure should not be defined as being limited to the aforementioned embodiments, but should be defined by the appended claims and equivalents thereof.

The invention claimed is:

1. A method of receiving channel feedback information by an evolved node B (eNB) in a communication system using at least eight antenna ports, the method comprising:
   generating reference signal configuration information comprising power boosting information associated with reference signals;
   transmitting the reference signal configuration information to a user equipment (UE);
   transmitting the reference signals to the UE; and
   receiving the channel feedback information on a channel state estimated based on the reference signal configuration information from the UE,
   wherein the power boosting information comprises information on at least one radio resource to which zero power is allocated, and
   wherein the at least one radio resource is used for power boosting of at least one reference signal transmitted in a same symbol as the at least one radio resource and transmitted in different subcarrier from the at least one radio resource.

2. The method of claim 1, wherein generating the reference signal configuration information comprises:
   configuring at least one of resource information associated with the at least eight antenna ports to which the reference signals are allocated, pattern information associated with the at least eight antenna ports, or same power boosting information of the reference signals allocated to the at least eight antenna ports; and,
   generating the reference signal configuration information comprising the at least one configured resource information, configured pattern information, or configured power booting information.

3. The method of claim 1, wherein the information comprised in the power boosting information comprises information on a resource location of a reference signal to which zero power is allocated.

4. The method of claim 1, wherein a value of power boosting for at least one symbol comprising a maximum number of antenna ports among symbols allocated to the reference signals in a time axis, is set as a reference value, and wherein a power is added to the to the at least one reference signal located in the same symbol as the at least one radio resource so that a value of power boosting for the at least one reference signal located in the same symbol as the at least one radio resource has the same as the reference value.

5. The method of claim 1, wherein the power boosting information comprises information on a resource location at which a power level is applied, and,
   wherein the power level is adaptively controlled based on a location of the UE to which the reference signals are transmitted.

6. The method of claim 5, wherein the resource location denotes a resource location at which a power level is applied, and,
   wherein the power level is adaptively controlled based on a location of the UE.

7. The method of claim 1, wherein the power boosting to the reference signals for each symbol is uniform.

8. A method of transmitting channel feedback information by a user equipment (UE) in a communication system using at least eight antenna ports, the method comprising:
   receiving reference signal configuration information comprising power boosting information associated with reference signals from an evolved node B (eNB);
   receiving the reference signals from the eNB;
   generating the channel feedback information on a channel state estimated, based on the reference signal configuration information; and
   transmitting the channel feedback information to the eNB,
   wherein the power boosting information comprises information on at least one radio resource to which zero power is allocated, and
   wherein the at least one radio resource is used for power boosting of at least one reference signal received in a same symbol as the at least one radio resource and received in different subcarrier from the at least one radio resource.

9. The method of claim 8, wherein the reference signal configuration information comprises at least one of resource information associated with the at least eight antenna ports to which the reference signals are allocated, pattern information associated with the at least eight antenna ports, or same power boosting information of the reference signals allocated to the at least eight antenna ports.

10. The method of claim 8, wherein the information comprised in the power boosting information comprises information on a resource location to which zero power is allocated,
   wherein a value of power boosting for at least one symbol comprising a maximum number of antenna ports among symbols allocated to the reference signals in a time axis, is set as a reference value, and
   wherein a power is added to the at least one reference signal located in the same symbol as the at least one radio resource so that a value of power boosting for the at least one reference signal located in the same symbol as the at least one radio resource has the same as the reference value.

11. The method of claim 8, wherein:
   the power boosting information comprises information on a resource location at which a power level is applied,
   the power level is adaptively controlled based on a location of the UE to which the reference signals are transmitted,
   the resource location denotes a resource location at which a power level is applied, and,
   the power level is adaptively controlled based on a location of the UE.

12. An evolved node B (eNB) for receiving channel feedback information from a user equipment (UE) in a communication system using at least eight antenna ports, the eNB comprising:
   a transceiver; and
   a controller coupled with the transceiver and configured to:
      generate reference signal configuration information comprising power boosting information associated with reference signals,
      transmit the reference signal configuration information to a user equipment (UE)
      transmit the reference signals to the UE, and
      receive the channel feedback information on a channel state estimated based on the reference signal configuration information from the UE,
   wherein the power boosting information comprises information on at least one radio resource to which zero power is allocated, and
   wherein the at least one radio resource is used for power boosting of at least one reference signal transmitted in a same symbol as the at least one radio resource and transmitted in different subcarrier from the at least one radio resource.

13. The eNB of claim 12, wherein the controller is further configured to:
   configure at least one of resource information associated with the at least eight antenna ports to which the reference signals are allocated, pattern information associated with the at least eight antenna ports, or same power boosting information of the reference signals allocated to the at least eight antenna ports; and,
   generate the reference signal configuration information comprising the at least one configured resource information, configured pattern information, or configured power booting information.

14. The eNB of claim 12, wherein:
   the information comprised in the power boosting information comprises information on a resource location of a reference signal to which zero power is allocated,
   a value of power boosting for at least one symbol comprising a maximum number of antenna ports among symbols allocated to the reference signals in a time axis, is set as a reference value, and
   a power is added to the at least one reference signal located in the same symbol as the at least one radio resource so that a value of power boosting for the at least one reference signal located in the same symbol as the at least one radio resource has the same as the reference value.

15. The eNB of claim 12, wherein:
   the power boosting information comprises information on a resource location at which a power level is applied,
   the power level is adaptively controlled based on a location of the UE to which the reference signals are transmitted.

16. The eNB of claim 12, wherein the power boosting to the reference signals for each symbol is uniform.

17. A user equipment (UE) for transmitting channel feedback information to an evolved node B (eNB) in a communication system using at least eight antenna ports, the UE comprising:
   a transceiver; and
   a controller coupled with the transceiver and configured to:
      receive reference signal configuration information comprising power boosting information associated with reference signals from an evolved node B (eNB), receive the reference signals from the eNB, generate the channel feedback information on a channel state estimated based on the reference signal configuration information, and transmit the channel feedback information to the eNB, wherein the power boosting information comprises information on at least one radio resource to which zero power is allocated, and wherein the at least one radio resource is used for power boosting of at least one reference signal received in a same symbol as the at least one radio resource and received in different subcarrier from the at least one radio resource.

18. The UE of claim 17, wherein the reference signal configuration information comprises at least one of resource information associated with the at least eight antenna ports to which the reference signals are allocated, pattern information associated with the at least eight antenna ports, or same power boosting information of the reference signals allocated to the at least eight antenna ports.

19. The UE of claim 17, wherein:
the information comprised in the power boosting information comprises information on a resource location to which zero power is allocated,
a value of power boosting for at least one symbol comprising a maximum number of antenna ports among symbols allocated to the reference signals in a time axis, is set as a reference value, and
a power is added to the at least one reference signal located in the same symbol as the at least one radio resource so that a value of power boosting for the at least one reference signal located in the same symbol as the at least one radio resource has the same as the reference value.

20. The UE of claim 17, wherein:
the power boosting information comprises information on a resource location at which a power level is applied, and,
the power level is adaptively controlled based on a location of the UE to which the reference signals are transmitted.

* * * * *